(12) United States Patent
Watson et al.

(10) Patent No.: US 7,675,849 B2
(45) Date of Patent: Mar. 9, 2010

(54) SYSTEM AND METHOD FOR ROUTING COMMUNICATION SIGNALS VIA A DATA DISTRIBUTION NETWORK

(75) Inventors: Philip Watson, Lake Forest, CA (US); Paul Anthony Margis, Irvine, CA (US); Long Bui, Aliso Viejo, CA (US)

(73) Assignee: Panasonic Avionics Corporation, Bothell, WA (US)

( * ) Notice: Subject to any disclaimer, the term of this patent is extended or adjusted under 35 U.S.C. 154(b) by 861 days.

(21) Appl. No.: 11/277,896

(22) Filed: Mar. 29, 2006

(65) Prior Publication Data

US 2006/0293190 A1    Dec. 28, 2006

Related U.S. Application Data

(60) Provisional application No. 60/666,651, filed on Mar. 29, 2005.

(51) Int. Cl.
*H04L 1/00*       (2006.01)
*H04L 12/26*      (2006.01)
*G01R 31/08*      (2006.01)
*G06F 11/00*      (2006.01)
*H04J 1/16*       (2006.01)
*H04J 3/14*       (2006.01)
*H04N 7/18*       (2006.01)

(52) U.S. Cl. ............................. 370/217; 725/75; 725/76
(58) Field of Classification Search .................. 370/217, 370/220; 725/76, 75
See application file for complete search history.

(56) References Cited

U.S. PATENT DOCUMENTS 5,463,656 A    10/1995  Polivka et al.

5,596,647 A    1/1997   Wakai et al.

(Continued)

FOREIGN PATENT DOCUMENTS

WO    WO 03/032503 A2    4/2003

(Continued)

OTHER PUBLICATIONS

US, Office Action, U.S. Appl. No. 09/952,629, Mar. 14, 2006.

(Continued)

*Primary Examiner*—Ayaz R Sheikh
*Assistant Examiner*—Tarell Hampton
(74) *Attorney, Agent, or Firm*—Orrick, Herrington & Sutcliffe LLP

(57) ABSTRACT

A distribution system for vehicle information systems and methods for manufacturing and using same. The distribution system supports high-bandwidth communications among system resources via one or more active routing systems. Comprising a plurality of communication ports coupled via a high-speed switching system, each routing system transparently splits incoming communication signals received via an input communication port. The routing system thereby can provide the incoming communication to a plurality of output communication ports without effecting signal bandwidth. By providing each routing system with a bypass system, the distribution system likewise can bypass one or more of the high-speed switching system in the event of a distribution system failure such that communications among the system resources can be maintained. As a result, passengers traveling aboard the vehicle can enjoy high-speed access to viewing content during travel with limited interruption in service and without unwanted travel delays.

58 Claims, 12 Drawing Sheets

U.S. PATENT DOCUMENTS

| | | | |
|---|---|---|---|
| 5,617,331 A | 4/1997 | Wakai et al. | |
| 5,745,159 A | 4/1998 | Wax et al. | |
| 5,760,819 A | 6/1998 | Sklar et al. | |
| 5,790,175 A | 8/1998 | Sklar et al. | |
| 5,801,751 A | 9/1998 | Sklar et al. | |
| 5,889,775 A | 3/1999 | Sawicz et al. | |
| 5,929,895 A | 7/1999 | Berry et al. | |
| 5,953,429 A | 9/1999 | Wakai et al. | |
| 5,959,596 A | 9/1999 | McCarten et al. | |
| 5,966,442 A | 10/1999 | Sachdev | |
| 5,990,928 A | 11/1999 | Sklar et al. | |
| 6,201,797 B1 | 3/2001 | Leuca et al. | |
| 6,208,307 B1 | 3/2001 | Frisco et al. | |
| 6,249,913 B1 | 6/2001 | Galipeau et al. | |
| 6,499,027 B1 | 12/2002 | Weinberger | |
| 6,529,706 B1 | 3/2003 | Mitchell | |
| 6,570,881 B1* | 5/2003 | Wils et al. | 370/410 |
| 6,611,537 B1* | 8/2003 | Edens et al. | 370/503 |
| 6,741,841 B1 | 5/2004 | Mitchell | |
| 6,748,597 B1 | 6/2004 | Frisco et al. | |
| 6,757,712 B1 | 6/2004 | Bastian et al. | |
| 6,782,392 B1 | 8/2004 | Weinberger et al. | |
| 6,796,495 B2 | 9/2004 | Stahl et al. | |
| 6,807,148 B1 | 10/2004 | Eicher | |
| 6,807,538 B1 | 10/2004 | Weinberger et al. | |
| 6,810,527 B1 | 10/2004 | Conrad et al. | |
| 6,876,905 B2 | 4/2005 | Farley et al. | |
| 6,885,863 B2 | 4/2005 | Parkman et al. | |
| 6,899,390 B2 | 5/2005 | Sanford et al. | |
| 6,973,479 B2 | 12/2005 | Brady, Jr. et al. | |
| 6,985,942 B2 | 1/2006 | D'Annunzio et al. | |
| 6,990,338 B2 | 1/2006 | Miller et al. | |
| 7,003,293 B2 | 2/2006 | D'Annunzio | |
| 7,036,889 B2 | 5/2006 | Sanfrod et al. | |
| 7,100,187 B2 | 8/2006 | Pierzga et al. | |
| 7,124,426 B1 | 10/2006 | Tsuria et al. | |
| 7,161,788 B2* | 1/2007 | Richie et al. | 361/213 |
| 7,177,638 B2 | 2/2007 | Funderburk et al. | |
| 7,280,825 B2 | 10/2007 | Keen et al. | |
| 7,454,203 B2 | 11/2008 | Levitan | |
| 7,483,696 B1 | 1/2009 | Mitchell | |
| 7,496,361 B1 | 2/2009 | Mitchell et al. | |
| 2002/0059614 A1 | 5/2002 | Lipsanen et al. | |
| 2002/0087992 A1 | 7/2002 | Bengeult et al. | |
| 2002/0152470 A1 | 10/2002 | Hammond | |
| 2002/0164960 A1* | 11/2002 | Slaughter et al. | 455/73 |
| 2003/0043760 A1 | 3/2003 | Taylor | |
| 2003/0055975 A1 | 3/2003 | Nelson et al. | |
| 2003/0069015 A1 | 4/2003 | Brinkley et al. | |
| 2003/0069990 A1 | 4/2003 | D'Annunzio et al. | |
| 2003/0084130 A1 | 5/2003 | D'Annunzio | |
| 2003/0084451 A1 | 5/2003 | Pierzga et al. | |
| 2003/0085818 A1 | 5/2003 | Renton et al. | |
| 2003/0093798 A1 | 5/2003 | Rogerson | |
| 2003/0107248 A1 | 6/2003 | Sanford et al. | |
| 2003/0148736 A1 | 8/2003 | Wright et al. | |
| 2003/0160710 A1 | 8/2003 | Baumgartner et al. | |
| 2003/0184449 A1 | 10/2003 | Baumgartner et al. | |
| 2003/0217363 A1 | 11/2003 | Brady, Jr. et al. | |
| 2004/0001303 A1* | 1/2004 | Doblar et al. | 361/601 |
| 2004/0077308 A1 | 4/2004 | Sanford et al. | |
| 2004/0078821 A1 | 4/2004 | Frisco et al. | |
| 2004/0098745 A1 | 5/2004 | Marston et al. | |
| 2004/0108963 A1 | 6/2004 | Clymer et al. | |
| 2004/0139467 A1* | 7/2004 | Rogerson et al. | 725/76 |
| 2004/0183346 A1 | 9/2004 | Sanford et al. | |
| 2004/0235469 A1 | 11/2004 | Krug | |
| 2004/0252965 A1 | 12/2004 | Moreno et al. | |
| 2004/0252966 A1 | 12/2004 | Holloway et al. | |
| 2005/0021602 A1* | 1/2005 | Noel et al. | 709/203 |
| 2005/0067530 A1 | 3/2005 | Schafer, Jr. et al. | |
| 2005/0202785 A1 | 9/2005 | Meyer | |
| 2005/0216938 A1 | 9/2005 | Brady et al. | |
| 2005/0273823 A1 | 12/2005 | Brady, Jr. et al. | |
| 2005/0278753 A1 | 12/2005 | Brady, Jr. et al. | |
| 2005/0278754 A1 | 12/2005 | Bleacher et al. | |
| 2005/0281223 A1 | 12/2005 | D'Annunzio | |
| 2006/0010438 A1 | 1/2006 | Brady, Jr. et al. | |
| 2006/0032979 A1 | 2/2006 | Mitchell et al. | |
| 2006/0048196 A1 | 3/2006 | Yau | |
| 2006/0088001 A1 | 4/2006 | Reitmann et al. | |
| 2006/0174285 A1 | 8/2006 | Brady, Jr. et al. | |
| 2006/0212909 A1* | 9/2006 | Girard et al. | 725/73 |
| 2006/0217121 A1 | 9/2006 | Soliman et al. | |
| 2006/0234700 A1 | 10/2006 | Funderburk et al. | |
| 2006/0250947 A1* | 11/2006 | Allen | 370/216 |
| 2006/0270373 A1 | 11/2006 | So | |
| 2007/0025240 A1* | 2/2007 | Snide | 370/217 |
| 2007/0044126 A1 | 2/2007 | Mitchell | |

FOREIGN PATENT DOCUMENTS

| | | |
|---|---|---|
| WO | WO 03/050000 A1 | 6/2003 |
| WO | WO 2004/003696 A2 | 1/2004 |
| WO | WO 2004/008277 A2 | 1/2004 |
| WO | WO 2006/062641 A2 | 6/2006 |
| WO | WO 2006/065381 A2 | 6/2006 |

OTHER PUBLICATIONS

US, Office Action, U.S. Appl. No. 09/952,629, Dec. 1, 2006.
US, Office Action, U.S. Appl. No. 09/952,629, Jun. 27, 2007.
US, Office Action, U.S. Appl. No. 09/952,629, Oct. 27, 2008.
US, Office Action, U.S. Appl. No. 09/952,629, Mar. 18, 2008.
US, Office Action, U.S. Appl. No. 09/952,629, Jun. 2, 2009.
US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
US, Notice of Allowance and Fees due, U.S. Appl. No. 09/811,317, Jul. 14, 2003.
US, Office Action, U.S. Appl. No. 08/863,448, Sep. 24, 1997.
US, Office Action, U.S. Appl. No. 08/863,448, Apr. 27, 1998.
US, Notice of Allowance, U.S. Appl. No. 08/863,448, Feb. 17, 1999.
US, Office Action, U.S. Appl. No. 08/479,654, Jan. 24, 1997.
US, Office Action, U.S. Appl. No. 08/479,654, Aug. 21, 1995.
US, Office Action, U.S. Appl. No. 08/479,654, Mar. 1, 1996.
US, Office Action, U.S. Appl. No. 08/479,654, Aug. 5, 1997.
US, Office Action, U.S. Appl. No. 08/071,218, Dec. 7, 1994.
US, Office Action, U.S. Appl. No. 08/071,218, Apr. 20, 1995.
US, Notice of Allowance and Fees due, U.S. Appl. No. 08/071,218, Aug. 7, 1995.
US, Office Action, U.S. Appl. No. 08/480,666, Feb. 9, 1996.
US, Notice of Allowance and Fees due, U.S. Appl. No. 08/480,666, Sep. 5, 1996.
US, Office Action, U.S. Appl. No. 08/480,666, Oct. 16, 1996.
US, Office Action, U.S. Appl. No. 08/480,666, Nov. 22, 1996.
JP, Office Action, 2004-199893, Jul. 5, 2005.
JP, Office Action, 2006-000840, Feb. 28, 2007.
US, Office Action, U.S. Appl. No. 08/363,228, Oct. 3, 1995.
US, Office Action, U.S. Appl. No. 08/363,228, Mar. 27, 1996.
US, Notice of Allowance and Fees due, U.S. Appl. No. 08/363,228, Apr. 9, 1996.
US, Office Action, U.S. Appl. No. 10/772,565, Mar. 4, 2009.
PCT, International Search Report, PCT/US2004/017666, Apr. 2, 2005.
EP, Communication, App. No. 04754296.4-1241, Apr. 4, 2007.
AU, First Report, App. No. 2004251677, Sep. 26, 2008.
US, Office Action, U.S. Appl. No. 11/123,327, Dec. 11, 2008.
PCT, International Search Report, PCT/US2005/016513, Sep. 8, 2005.
PCT, International Preliminary Report, PCT/US2005/016513, Nov. 16, 2006.
EP, Communication, App. No. 05 749 692.9-1525, Jun. 15, 2007.
EP, Communication, App. No. 05 749 692.9-1525, Oct. 22, 2008.
US, Office Action, U.S. Appl. No. 11/154,749, Aug. 18, 2008.

US, Office Action, U.S. Appl. No. 11/154,749, Jan. 23, 2009.
PCT, International Search Report, PCT/US2005/021518, Jan. 3, 2006.
PCT, International Preliminary Report, PCT/US2005/021518, Jan. 4, 2007.
EP, Communication, App. No. 05 762 201.1-2202, May 18, 2007.
EP, Communication, App. No. 05 762 201.1-2202, Jul. 18, 2008.
US, Office Action, U.S. Appl. No. 11/379,360, Apr. 3, 2009.
PCT, International Search Report, PCT/US2006/014852, Dec. 4, 2006.
PCT, International Preliminary Report, PCT/US2006-014852, Nov. 1, 2007.
US, Office Action, U.S. Appl. No. 11/269,378, Aug. 20, 2008.
US, Office Action, U.S. Appl. No. 11/269,378, Apr. 28, 2009.
PCT, International Search Report, PCT/US2005/040380, Mar. 15, 2006.
PCT, International Preliminary Report, PCT/US2005/040380, May 18, 2007.
Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.

* cited by examiner

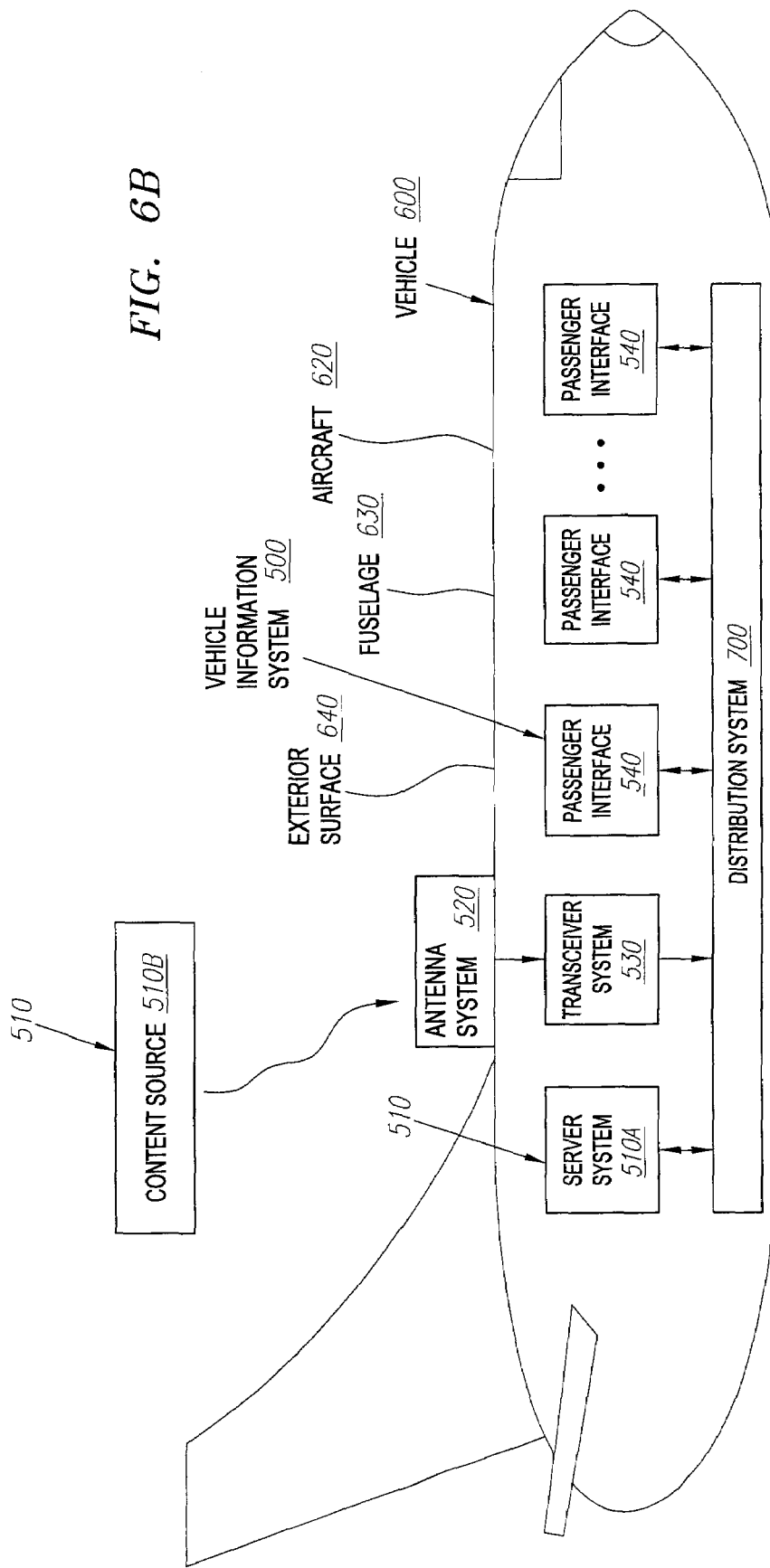

SYSTEM AND METHOD FOR ROUTING COMMUNICATION SIGNALS VIA A DATA DISTRIBUTION NETWORK

CROSS-REFERENCE TO RELATED APPLICATIONS

This application claims priority to a U.S. provisional patent application Ser. No. 60/666,651, filed on Mar. 29, 2005. Priority to the provisional application is expressly claimed, and the disclosure of the provisional application is hereby incorporated herein by reference in its entirety.

FIELD

The present disclosure relates generally to data distribution networks and more particularly, but not exclusively, to passenger entertainment systems installed aboard mobile platforms.

BACKGROUND

Passenger vehicles, such as automobiles and aircraft often provide vehicle information systems, such as passenger entertainment systems, to satisfy passenger demand for entertainment and other information content during travel.

Conventional vehicle information systems typically include video display systems, such as overhead cabin display systems or seatback display systems, and audio presentation systems, such as overhead speaker systems or headphones, for presenting viewing content. Individual controls also can be provided at the passenger seats for selecting viewing content for presentation. Including audio and video materials, the viewing content can be derived from a variety of content sources. For example, prerecorded viewing content, such as motion pictures and music, can be provided by internal sources, such as audio and video players, that are installed in the vehicle. The conventional vehicle information systems likewise can include antenna and receiver systems for receiving viewing content, such as live television programming, transmitted from one or more external content providers (or sources).

Such conventional vehicle information systems, however, suffer from many disadvantages. Turning to FIG. 1, for instance, an illustrative vehicle information system 100 is shown as having at least one content source 110 and a plurality of passenger interfaces 120, which are configured to communicate via a distribution system (or network) 130. The distribution system 130 includes at least one communication connection (or bus) 140 for coupling the content sources 110 and the passenger interfaces 120 as well as one or more conventional passive splitter (or switching) systems 150. Each splitter system 150 is configured to divide the communication connections 140 into a plurality of separate communication sub-connections, such as first and second communication connections 140A, 140B. Stated somewhat differently, each splitter system 150 separates the individual communication lines that comprise the communication connection 140 into two groups of communication lines. The first communication connection 140A includes those communication lines in one group; whereas, the communication lines in the other group form the second communication connection 1403.

As shown in FIG. 1, the splitter system 150 includes an input (or common) communication port 152 and a plurality of output ports 154. The input communication port 152 is configured to couple with the selected content source 110; whereas, each output port 154 couples with one or more associated passenger interface systems 120. The splitter system 150 of FIG. 1 is illustrated as routing each of the first communication connections 140A to a first output port 154A and each of the second communication connections 140B to a second output port 154B. Since the passenger interface systems 120 communicate with the selected content source 110 by way of the splitter system 150, the passenger interface systems 120A, 120B of FIG. 1 communicate with the selected content source 110 via the first and second communication connections 140A, 140B, respectively. Each passenger interface system 120 therefore is limited to communicating with the selected content source 110 via only a fraction of the communication connection 140 such that the bandwidth capability at each passenger seat is reduced.

In view of the foregoing, a need exists for an improved vehicle information system that overcomes the aforementioned obstacles and deficiencies of currently-available vehicle information systems.

BRIEF DESCRIPTION OF THE DRAWINGS

FIG. 6B is an exemplary block diagram illustrating an alternative embodiment of the vehicle information system of FIG. 6A, wherein the vehicle information system is installed aboard an aircraft.

Figure 1:
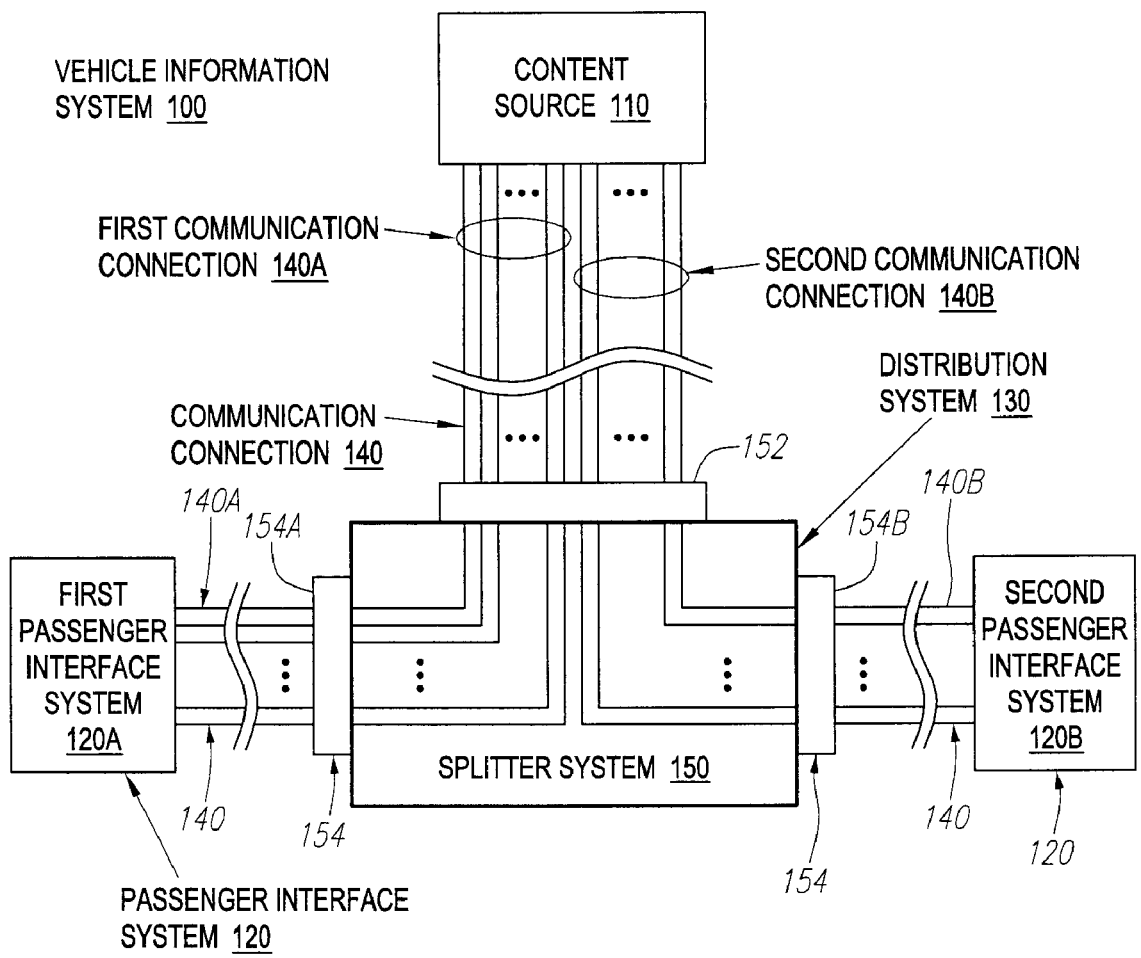
FIG. 1 is a prior art vehicle information system, wherein each passenger interface system communicates with a selected content source via a passive splitter system.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not describe every aspect of the present disclosure and do not limit the scope of the disclosure.

DETAILED DESCRIPTION OF THE PREFERRED EMBODIMENTS

Since currently-available vehicle information systems provide reduced-bandwidth communications between the content sources and the passenger interface systems, a distribution system for vehicle information systems that supports high-bandwidth communications can prove desirable and provide a basis for a wide range of system applications, such as in passenger entertainment systems for use on aircraft and other types of vehicles. This result can be achieved according to one embodiment disclosed herein, by employing a distribution system 230 as shown in FIG. 2.

Figure 2:
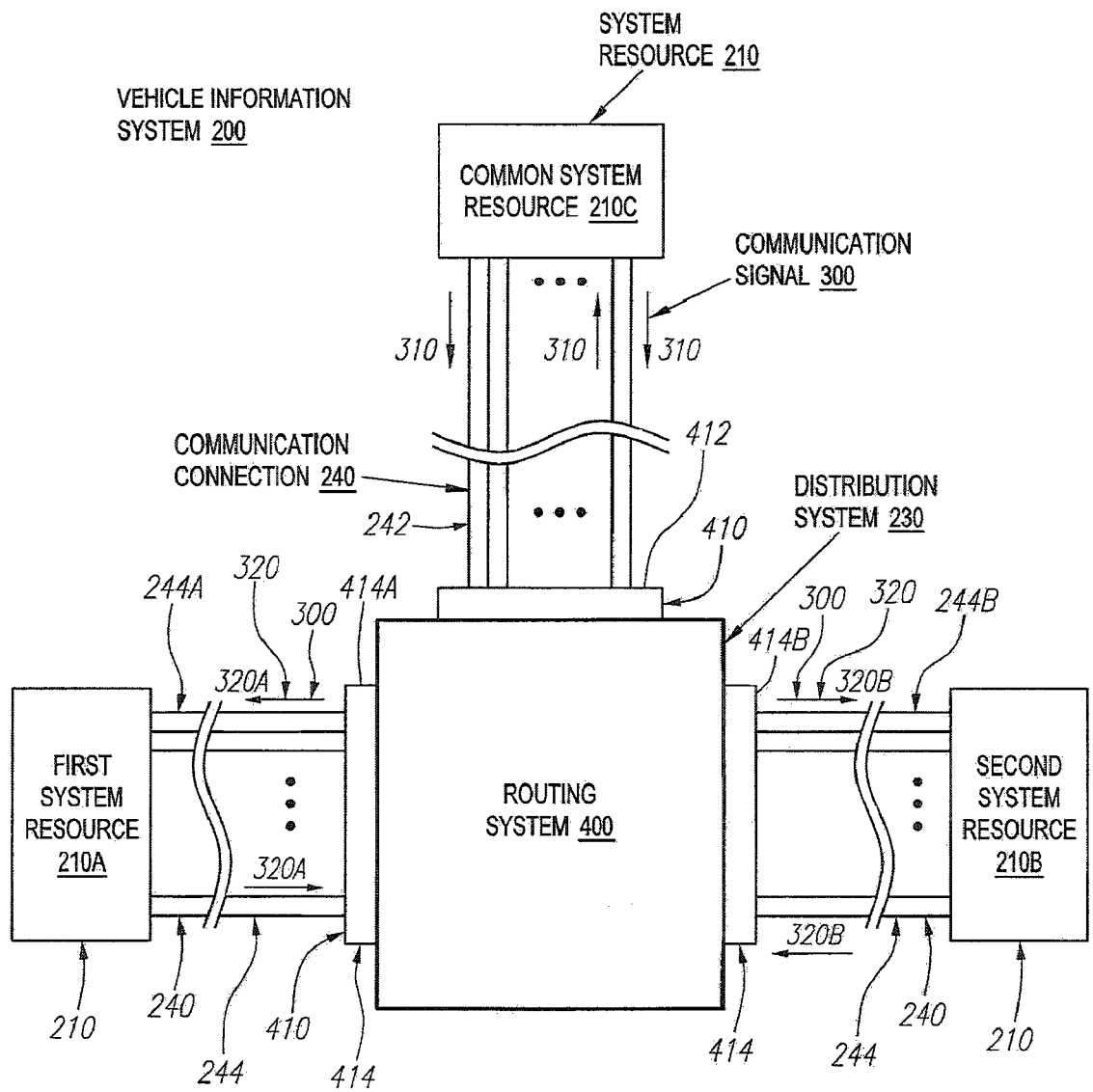
FIG. 2 is an exemplary top-level block diagram illustrating an embodiment of a distribution system for an information system, wherein the distribution system includes a routing system for supporting high-bandwidth communication among a plurality of system resources without effecting bandwidth.

Turning to FIG. 2, an information system 200 is shown that includes a distribution system 230 for distributing communication signals 300 among a plurality of conventional system resources 210, such as one or more server systems, workstations, mass storage systems, and/or a printing systems, without limitation. The distribution system 230, for example, can be provided as a conventional wired and/or wireless communication network, including a local area network (LAN), a wide area network (WAN), a campus area network (CAN), personal area network (PAN) and/or a wireless local area network (WLAN), of any kind. Illustrative distribution systems 230 are set forth in the co-pending U.S. patent application, entitled "SYSTEM AND METHOD FOR MANAGING CONTENT ON MOBILE PLATFORMS," Ser. No. 11/123,327, filed on May 6, 2005, which is assigned to the assignee of the present application and the disclosure of which is hereby incorporated herein by reference in its entirety. Preferably being configured to support high data transfer rates, the distribution system 230 can comprise a high-speed Ethernet network, such as any type of Fast Ethernet (such as 100Base-X and/or 100Base-T) communication network and/or Gigabit (such as 100Base-X and/or 1000Base-T) Ethernet communication network, and can include one or more communication connections (or busses) 240 that have a typical data transfer rate of at least approximately one hundred megabits per second (100 Mbps).

The distribution system 230 likewise can be provided with any appropriate topology, protocol, and/or architecture. Comprising a geometric arrangement of the system resources 210 common network topologies include mesh, star, bus, ring, and daisy-chain network topologies. The topology of the distribution system 230 likewise can comprise a hybrid of the common network topologies, such as a network tree topology. Network protocols define a common set of rules and signals by which the system resources 290 can communicate via the distribution system 230. Illustrative types of network protocols include Ethernet and Token-Ring network protocols; whereas, peer-to-peer and client/server network architectures are examples of typical network architectures. It will be appreciated that the network system types, topologies, protocols, and architectures identified above are merely exemplary and not exhaustive.

As shown in FIG. 2, the distribution system 230 advantageously includes at least one routing system 400 for supporting high-bandwidth communication among the system resources 210. Each routing system 400 can be provided as any conventional type of routing (or switching) system and preferably comprises a high-speed routing system. If configured to support communications in accordance with the Gigabit (such as 1000Base-X and/or 1000Base-T) Ethernet standard, for example, the routing system 400 can negotiate appropriate communication data rates, including ten, one hundred, or one thousand megabits per second (10/100/1000 Mbps), and/or a duplex mode, such as a half duplex mode and/or a full duplex mode, with each of the system resources 210. Preferably supporting wired communications with each system resource 210 within its physical range, the routing system 400 can be configured to support wired and/or wireless communications with the system resources 210 in the manner set forth above with reference to the distribution system 230. For example, the routing system 400 can support the wired communication with the system resources 210 via one or more copper connections and/or fiber optic connections. The fiber optic connections can be trunked, as desired.

The routing system 400 is illustrated as having a plurality of communication ports 410, including at least one input (or common) communication port 412 and two or more output communication ports 414. Although the communication ports 410 are shown and described herein as comprising input communication ports 412 and output communication ports 414 for purposes of clarity, it is understood that each communication port 410, including the input communication ports 412 and output communication ports 414, of the routing system 400 can be configured to support unidirectional communication and/or bi-directional communication of the communication signals 300. Stated somewhat differently, the routing system 400 can transmit and/or receive communication signals 300 via each input communication port 412 and can transmit and/or receive communication signals 300 via each output communication port 414 without limitation. Further, although shown and described with reference to FIG. 2 as having one input communication port 412 and two output communication ports 414 for purposes of illustration only, the routing system 400 can include any appropriate quantity of the input communication ports 412 and any suitable number of the output communication ports 414 as desired.

Each communication port 410 of the routing system 400 can be configured to directly couple with a selected system resource 210 and/or indirectly couple with the selected system resources 210 via one or more intermediate system resources 210, such as a firewall and/or a conversion system. As shown in FIG. 2, the communication ports 410 couple with, and communicate with, the selected system resource 210 via an intermediate communication connection (or bus) 240. The communication connection 240 comprises a predetermined number of individual communication connections (or lines). Typically comprising eight individual communication connections, the communication connection 240 can include any suitable number of individual communication connections, which preferably are provided as high-speed communication connections in the manner set forth in more detail above.

Turning to the input communication port 412 of the routing system 400, for example, the input communication port 412 is shown as being configured to couple with, and communicate with, a common system resource 210C via a common communication connection 242. The communication connection 242 permits common communication signals 310 to be exchanged between the common system resource 210C and the routing system 400. Similarly, each output communication port 414 of the routing system 400 can couple with, and communicate with, a selected system resource 210 to exchange output communication signals 320 via a output communication connection 244. The routing system 400 of FIG. 2 includes a first output communication port 414A and a second output communication port 414B. The first output communication port 414A of the routing system 400 can communicate with a first system resource 210A via a first output communication connection 244A; whereas, the second output communication port 414B can communicate with a second system resource 210B via a second output communication connection 244B. Thereby, the routing system 400 can exchange first output communication signals 320A with the first system resource 210A and second output communication signals 320B with the second system resource 210B.

The routing system 400 thereby can be configured to exchange communication signals 300 among the system resources 210. For example, the routing system 400 can receive a selected common communication signal 310 from the common system resource 210C and provide the selected common communication signal 310 to the first system resource 210A as a first output communication signal 320A and/or the second system resource 210B as a second output communication signal 320B. A selected first output communication signal 320A from the first system resource 210A can be received by the routing system 400 and provided to the common system resource 210C as a common communication signal 310. The routing system 400 likewise can receive a selected second output communication signal 320B from the second system resource 210B and provide the selected second output communication signal 320B to the common system resource 210C as a common communication signal 310. As desired, selected first and second output communication signals 320A, 320B can be exchanged between the first system resource 210A and the second system resource 210B via the routing system 400.

As discussed above, each communication connection 240 comprises a predetermined number of individual communication connections (or lines). The routing system 400 advantageously permits the common communication connection 242 and the output communication connections 244 to have a uniform number of individual communication connections (or lines). Stated somewhat differently, a predetermined communication (or data) width for the common communication connection 242 is approximately equal to a predetermined communication (or data) width for the output communication connections 244. Each of the system resources 210A, 210B therefore can communicate with the common system resource 210C via an output communication connection 244A, 244B that includes the same number of individual communication connections (or lines) as the number of individual communication connections (or lines) comprising the common communication connection 242. As a result, the bandwidth of the common communication connection 242 and each output communication connection 244 are substantially identical. The routing system 400 thereby can transparently split the common communication connection 242 to provide a plurality of output communication connections 244, such that the plurality of system resources 210 can exchange high-speed communication signals 300, without effecting bandwidth.

Figure 3:
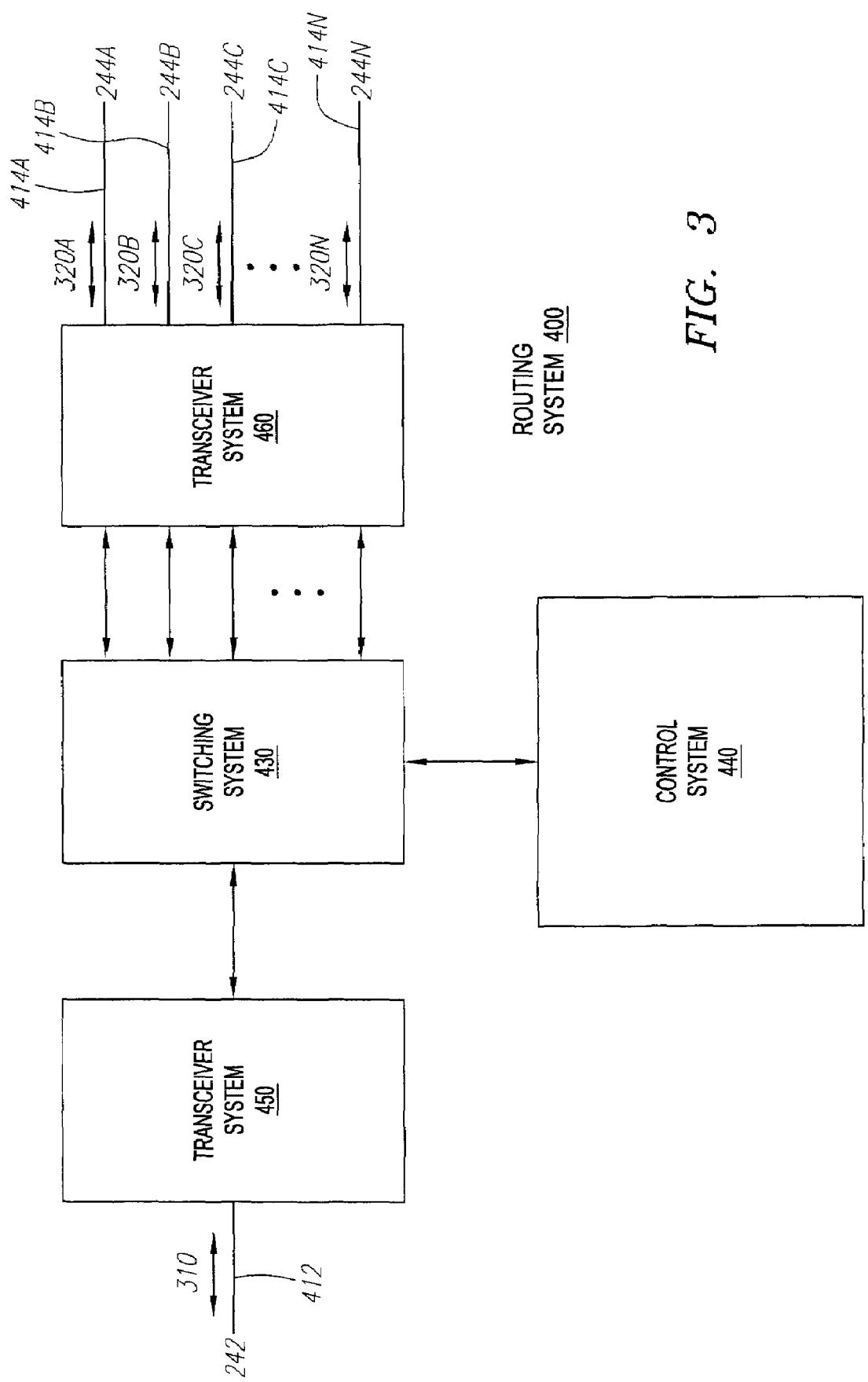
FIG. 3 is an exemplary block diagram illustrating a preferred embodiment of the distribution system of FIG. 2, wherein the routing system includes an active switching system.

A preferred embodiment of the routing system 400 is illustrated in FIG. 3. In the manner discussed above with reference to FIG. 2, the routing system 400 includes at least one input (or common) communication port 412 for exchanging common communication signals 310 with a common system resource 210C (shown in FIG. 2) via a communication connection 242 and a plurality of output communication ports 414A-N for respectively exchanging output communication signals 320A-N with a plurality of system resources 210A-N (shown in FIG. 2) via a plurality of output communication connections 244A-N. As shown in FIG. 3, the routing system 400 can comprise an active routing system, which includes an active switching system 430 that operates under the control of a control system 440. The switching system 430 can be provided as any conventional type of routing (or switching) system and preferably comprises a high-speed switching system in the manner discussed above regarding the routing system 400 of FIG. 2. If configured to support communications in accordance with the Gigabit (such as 1000Base-X and/or 1000Base-T) Ethernet standard, for example, the switching system 430 can be provided as a high-speed Ethernet switching system.

The switching system 430 is disposed substantially between, and in communication with, the input communication port 412 and the output communication ports 414A-N of the routing system 400. As desired the switching system 430 can be directly coupled with the input communication port 412 and/or at least one of the output communication ports 414A-N. As illustrated in FIG. 3, the switching system 430 likewise can indirectly couple with the input communication port 412 and/or at least one of the output communication ports 414A-N. The switching system 430 of FIG. 3, for example, is shown as being coupled with the input communication port 412 via a first transceiver system 450; whereas, a second transceiver system 460 can couple the switching system 430 and the output communication ports 414A-N. Being provided as conventional transceiver systems, such as conventional high-speed Ethernet transceiver systems, the transceiver systems 450, 460 can be integrated with the switching system 430 and/or separate from the switching system 430 as shown in FIG. 3.

The switching system 430 operates under the control of the control system 440. Being provided as a conventional control system, the control system 440 can comprise any appropriate number and type of conventional processing systems (not shown), such as one or more microprocessors (µPs), central processing units (CPUs), and/or digital signal processors (DSPs). The control system 440 likewise can include a memory system (not shown) for storing and providing other conventional types of information, including instruction code, such as software or firmware, intermediate calculation results, and other information associated with the processing system. The memory system can comprise any conventional type of memory system, such as any suitable electronic, magnetic, and/or optical storage media, without limitation. Exemplary storage media can include one or more static random access memories (SRAMs), dynamic random access memories (DRAMs), synchronous dynamic random access memories (SDRAMs), electrically-erasable programmable read-only memories (EEPROMs), FLASH memories, hard drives (HDDs), compact disks (CDs), and/or digital video disks (DVDs) of any kind.

If configured to support communications in accordance with the Gigabit (such as 100Base-X and/or 1000Base-T) Ethernet standard, the control system 440 can include an Ethernet MAC (not shown) for configuring the switching system 430. A switch controller (not shown) likewise can be included in the control system 440 and can be used to configure at least one of the transceiver systems 450, 460. The control system 440 thereby can configure the switching system 430 and/or the transceiver systems 450, 460 to couple selected communication ports 412, 414A-N in a predetermined manner. Therefore, the control system 440 can help to ensure that communication signals 310, 320A-N are exchanged among the selected communication ports 412, 414A-N.

Figure 4A:
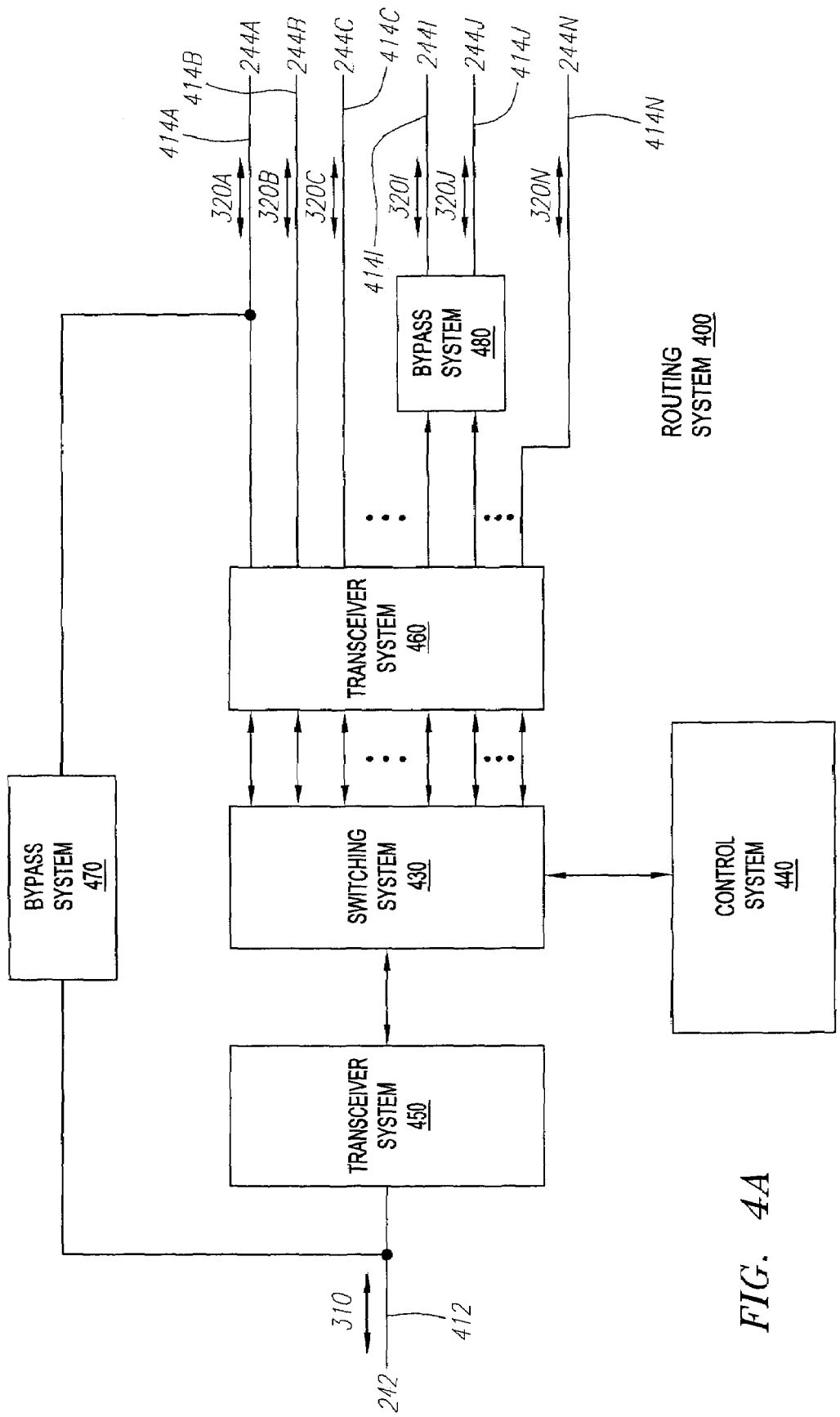
FIG. 4A is an exemplary block diagram illustrating an alternative embodiment of the routing system of FIG. 3, wherein the routing system includes at least one bypass system for at least partially bypassing the active switching system.
Figure 4B:
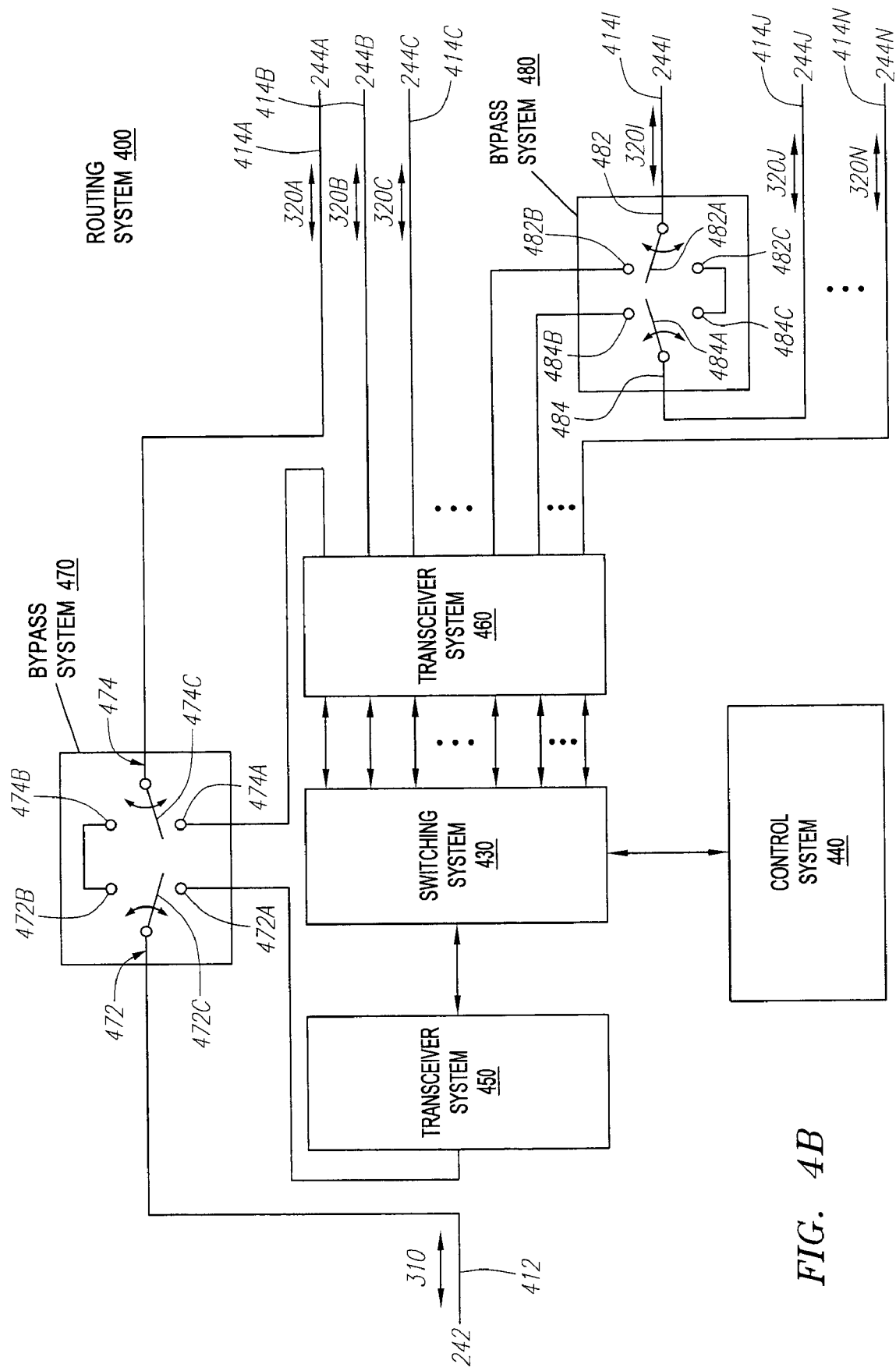
FIG. 4B is a detail drawing illustrating one preferred embodiment of the bypass system of FIG. 4A, wherein the bypass system comprises an electronic relay system.

Turning to FIGS. 4A-B, the routing system 400 preferably includes at least one bypass system 470, 480 for at least partially bypassing the active switching system 430. The bypass systems 470, 480 advantageously permit the routing system 400 to support the exchange communication signals 310, 320A-N among selected communication ports 412, 414A-N even if the switching system 430 fails. In other words, the bypass systems 470, 480 provide the routing system 400 with a source of redundancy to help ensure reliable communications. The bypass systems 470, 480 can operate under the control of the control system 440 in the manner discussed in more detail above with reference to FIG. 3. Being transparent to system operations when the switching system 430 is in a normal operation mode, each of the bypass systems 470, 480 preferably are biased to automatically activate, coupling the selected communication ports 412, 414A-N if the switching system 430 enters a failure mode, such as a loss of routing system power 498 (shown in FIG. 5).

The bypass systems 470, 480 can support exchanges of the common communication signal 310 of the input communication port 412 and the output communication signal 320A-N of at least one output communication port 414A-N and/or exchanges of output communication signals 320A-N among two or more output communication ports 414A-N. As shown in FIG. 4A, for example, the bypass system 470 is configured to selectably couple the input communication port 412 and the output communication port 414A; whereas, the output communication ports 414I, 414J can be selectably coupled via the bypass system 480. Thereby, if the switching system 430 fails, the bypass system 470 can activate to support the exchange of the communication signals 310, 320A between the input communication port 412 and the output communication port 414A. The bypass system 480 likewise can activate to support the exchange of the output communication signals 320I, 320J between the output communication ports 414I, 414J if the switching system 430 fails. Although shown and described with reference to FIGS. 4A-B as comprising two bypass systems 470, 480 each for selectably coupling pairs of communication ports 412, 414A-N for purposes of illustration only, the routing system 400 can include any suitable number of bypass systems 470, 480, each being configured to support the exchange of communication signals 310, 320A-N among any appropriate number of communication ports 412, 414A-N.

FIG. 4B illustrates one preferred embodiment of the bypass systems 470, 480. As shown in FIG. 4B, the bypass systems 470, 480 each can be provided as switching systems. The bypass systems 470, 480 each can comprise any conventional type of switching system, such as an electromechanical switching system and/or electronic switching system, and can be provided with any suitable arrangement (or configuration) of electrical contacts. To help ensure continuity of operation for the routing system 400 if switching system 430 fails, each of the bypass systems 470, 480 preferably comprise electronic relay systems. The bypass systems 470, 480 thereby can rapidly activate to provide support for exchanges of the communication signals 310, 320A-N among the selected communication ports 412, 414A-N in the manner discussed above with reference to FIG. 4A.

As illustrated in FIG. 4B, the exemplary bypass system 470 can be provided as an electronic relay system with a double pole/double throw (DPDT) contact arrangement. Comprising a conventional relay system, one pole 472 of the bypass system 470 of FIG. 4B includes a common wiper terminal 472C that can be controlled to engage either a first contact terminal 472A or a second contact terminal 472B. The common wiper terminal 472C is shown as being coupled with the input communication port 412 of the routing system 400; whereas, the first contact terminal 472A is coupled with the transceiver system 450. In other words, the pole 472 of the bypass system 470 is disposed substantially between the input communication port 412 and the transceiver system 450. Similarly, the other pole 474 of the bypass system 470 includes a common wiper terminal 474C that can be controlled to engage either a first contact terminal 474A or a second contact terminal 474B. The common wiper terminal 474C and the first contact terminal 474A are shown as being respectively coupled with the output communication port 414A and the transceiver system 460 such that the pole 474 of the bypass system 470 is disposed substantially between the output communication port 414A and the transceiver system 460. The second contact terminals 472B, 474B likewise are coupled.

Thereby, when the switching system 430 is in a normal operation mode, the pole 472 of the bypass system 470 couples the input communication port 412 with the transceiver system 450; whereas, the pole 474 couples the output communication port 414A with the transceiver system 460. The input communication port 412 and the output communication port 414A exchange the communication signals 310, 320A via the switching system 430 in the manner discussed above. If the switching system 430 enters a failure mode, however, the bypass system 470 immediately activates to rapidly switch the common wiper terminal 472C to engage the second contact terminal 472B of the pole 472 and to switch the common wiper terminal 474C to engage the second contact terminal 474B of the pole 474. Since the second contact terminals 472B, 474B are coupled, the input communication port 412 and the output communication port 414A continue to exchange the communication signals 310, 320A via the coupled second contact terminals 472B, 474B, and bypassing the malfunctioning switching system 430, without any significant interruption in communications.

The exemplary bypass system 480 likewise can be provided as an electronic relay system with a double pole/double throw (DPDT) contact arrangement in the manner discussed above with reference to the exemplary bypass system 470. The bypass system 480 can comprise a conventional relay system, having one pole 482 with a common wiper terminal 482G 482A that can be controlled to engage either a first contact terminal 482B or a second contact terminal 482C. The common wiper terminal 482A is shown as being coupled with a first output communication port 414I of the routing system 400; whereas, the first contact terminal 482B is coupled with the transceiver system 460. Similarly, the other pole 484 of the bypass system 480 includes a common wiper terminal 484A that can be controlled to engage either a first contact terminal 484B or a second contact terminal 484C. The common wiper terminal 484A and the first contact terminal 484B are shown as being respectively coupled with a second output communication port 414J and the transceiver system 460. The second contact terminals 482C, 484C likewise are coupled.

In the manner discussed above, the pole 482 of the bypass system 480 is disposed substantially between the first output communication port 414I and the transceiver system 460, and the pole 484 is disposed substantially between the second output communication port 414J and the transceiver system 460. Stated somewhat differently, the bypass system 480 is disposed substantially between the output communication ports 414I, 414J and the transceiver system 460. Therefore, when the switching system 430 is in a normal operation mode, the first output communication port 414I and the transceiver system 460 are coupled via the pole 482 of the bypass system 480, and the second output communication port 414J and the transceiver system 460 are coupled via pole 484. The output communication ports 414I, 414J therefore can exchange the output communication signals 320I, 320J via the switching system 430 in the manner discussed above.

If the switching system 430 enters a failure mode, the bypass system 480 immediately activates. The bypass system 480 thereby rapidly switches the common wiper terminal 482A to engage the second contact terminal 482C of the pole 482 and the common wiper terminal 484A to engage the second contact terminal 484C of the pole 484. Since the second contact terminals 482C, 484C are coupled, the output communication ports 414I, 414J likewise are coupled. The bypass system 480 therefore enables the malfunctioning switching system 430 to be bypassed such that the output communication ports 414I, 414J can continue to exchange the output communication signals 320I, 320J via the coupled second contact terminals 482C, 484C and without any significant interruption in communications.

Figure 5:
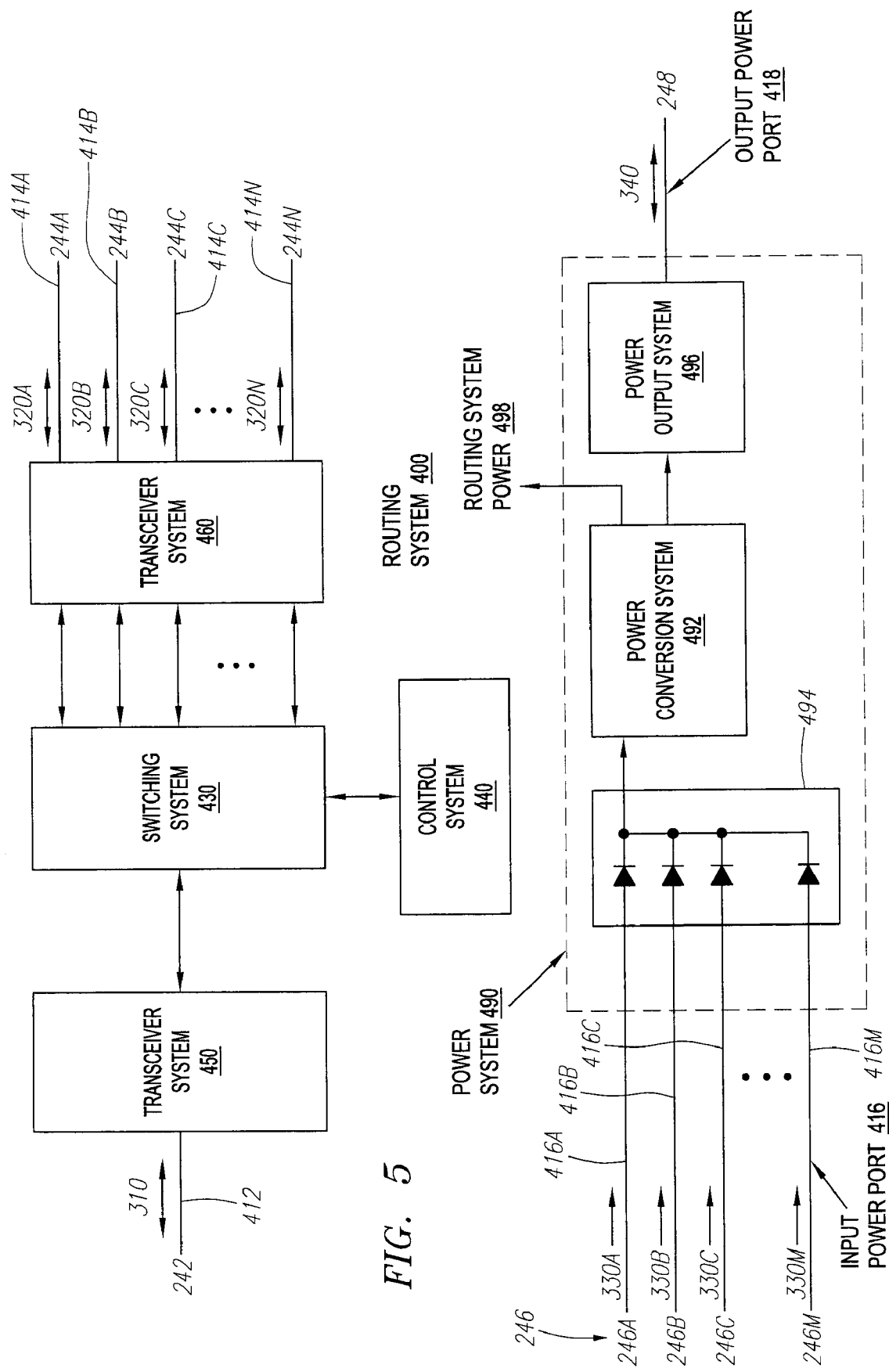
FIG. 5 is an exemplary block diagram illustrating another alternative embodiment of the routing system of FIG. 3, wherein the routing system includes a power system for distributing power among the plurality of system resources.

Alternatively, and/or in addition, the routing system 400 can include a power system 490 for distributing power among the plurality of system resources 210 (shown in FIG. 2). Turning to FIG. 5, for example, the power system 490 is shown as having a plurality of power ports, including two or more input power ports 416 and at least one power output port 418. The power system 490 can include any suitable number of input power ports 416, each being configured to receive an input power signal 330 from a selected system resource 210 via an associated input power communication connection 246. As shown in FIG. 5, the power system 490 can include input power ports 416A-M for receiving input power signals 330A-M from M selected system resources 210 via the input power communication connections 246A-M. Preferably comprising substantially uniform input power signals, the input power signals 330A-M can be provided with any appropriate voltage levels and/or current levels, including direct current (DC) voltages and/or alternating current (AC) voltages, as desired.

The power system 490 can process the input power signals 330A-M in any suitable manner to provide at least one output voltage signal 340 via the power output port 418. Each output voltage signal 340 can be provided with any voltage levels and/or current levels, including direct current (DC) voltages and/or alternating current (AC) voltages, that are suitable for any system resource 210 that receives the output voltage signal 340 from the power system 490. The power output port 418 of the power system 490 can provide the output voltage signal 340 to one or more system resources 210 via an output power communication connection 248. As desired, the power system 490 likewise can be configured to provide one or more internal voltages, such as routing system power 498, for the various system components, including the switching system 430, the control system 440, the bypass systems 470, 480 (shown in FIGS. 4A-B), and/or the transceiver systems 450, 460, of the routing system 400 as illustrated in FIG. 5.

As shown in FIG. 5, the power system 490 can include a power conversion system 492 for receiving the input power signals 330A-M and for providing the routing system power 498 and/or the output voltage signal 340. The power conversion system 492 can comprise a conventional power conversion system, such as a voltage regulation system and/or a DC-to-DC conversion system, of any kind. Preferably, the power conversion system 492 is provided as a plurality of redundant power conversion sub-systems (not shown) such that the power conversion system 492 can reliably provide the routing system power 498 and/or the output voltage signal 340 even if one of the power conversion sub-systems fails. Likewise, since the power system 490 receives the input power signals 330 from the plurality of selected system resources 210, the reliability of the power system 490 is further ensured because the power system 490 can continue to provide the routing system power 498 and/or the output voltage signal 340 even if one of the selected system resources 210 fails.

The power conversion system 492 can be directly coupled and/or indirectly with the input power ports 416 and/or the power output ports 418 as desired. As illustrated in FIG. 5, for example, the power conversion system 492 can be coupled with the input power ports 416 via an input power combining/protection system 494; whereas, an output power combining/protection system 496 can couple the power conversion system 492 and the power output ports 418. Receiving the input power signals 330 from the plurality of selected system resources 210, the input power combining/protection system 494 can combine the input power signals 330 into a single input power signal suitable for the power conversion system 492. The input power combining/protection system 494 likewise can provide conventional input voltage protection, such as overvoltage protection. For example, the input power combining/protection system 494 can include feedback protection circuitry, such as a diode array, for inhibiting an input power signal 330 from one selected system resource 210 from being fed back to the other selected system resources 210.

Similarly, the output power combining/protection system 496 can receive individual output voltages provided by each redundant power conversion sub-system of the power conversion system 492 and can combine the individual output voltages to form the output voltage signals 340, which are suitable for providing to other system resources 210. In the manner set forth above with reference to the input power combining/protection system 494, the output power combining/protection system 496 can provide conventional output voltage protection, such as overvoltage protection. The output power combining/protection system 496 can include feedback protection circuitry, such as a diode array, for inhibiting an individual output voltage from one of the redundant power conversion sub-systems from being fed back to the other redundant power conversion sub-systems of the power conversion system 492. The output power combining/protection system 496 likewise can protect the power conversion system 492 from being adversely affected by any failures experienced by the system resources 210 to which the output voltage signals 340 is supplied.

Figure 6A:
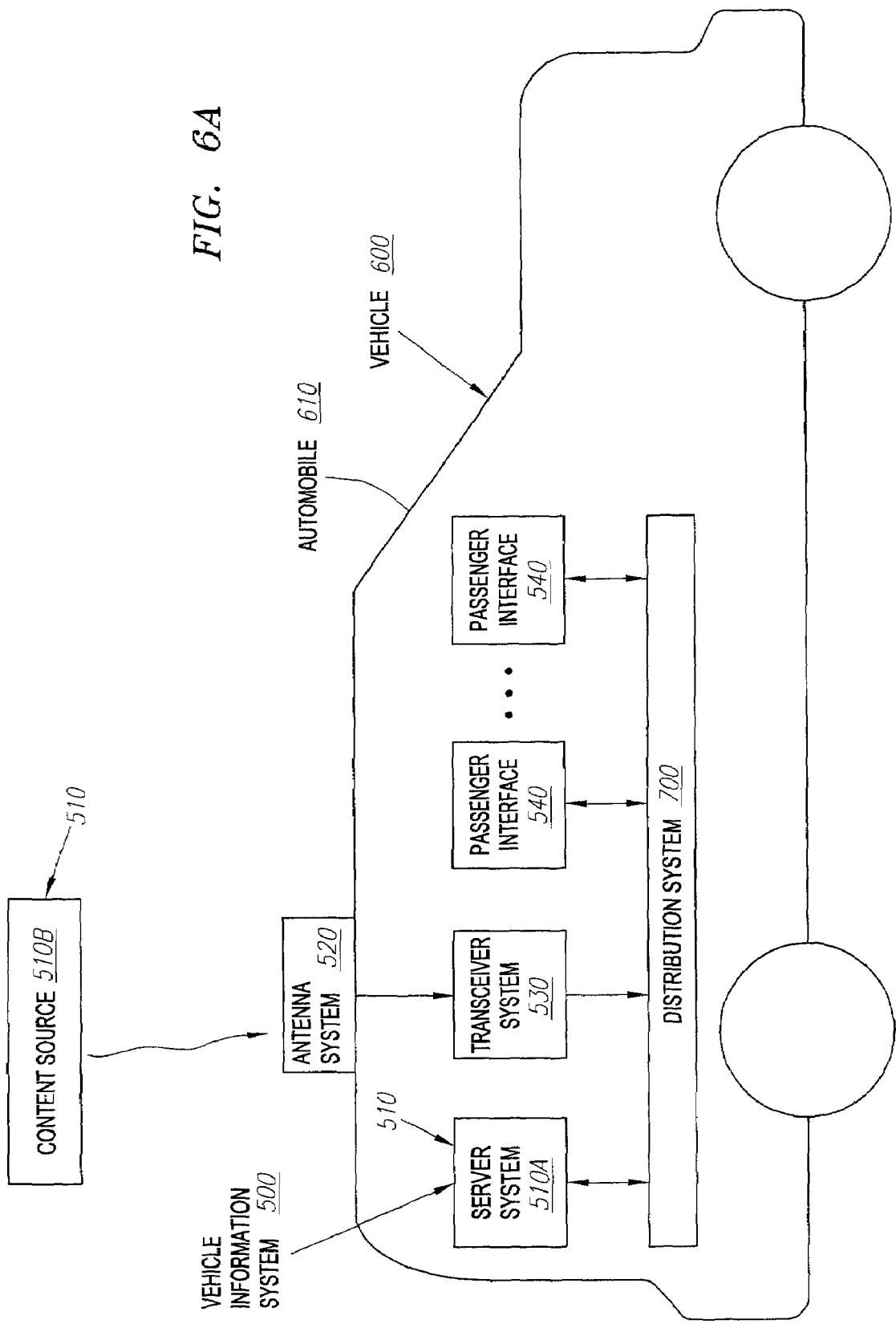
FIG. 6A is an exemplary block diagram illustrating an embodiment of the information system of FIG. 2, wherein the information system comprises a vehicle information system and is installed aboard an automobile.

Although the routing system 400 may be used in conjunction with information systems 200 (shown in FIG. 2) that are disposed in fixed locations, such as buildings, the routing system 400 likewise can advantageously be applied in portable system applications. Turning to FIGS. 6A-B, for example, the routing system 400 can be applied in a vehicle information system 500 that can be configured for installation aboard a wide variety of vehicles 600. Exemplary types of vehicles can include an automobile 610 (shown in FIG. 6A), an aircraft 620 (shown in FIG. 6B), a bus, a recreational vehicle, a boat, and/or a locomotive, without limitation. If installed on an aircraft 620 as illustrated in FIG. 6B, for example, the vehicle information system 500 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 6A-B, the vehicle information system 500 can present viewing content from one or more conventional content sources 510, including internal content sources, such as server system 510A, that are installed aboard the vehicle 600 and/or remote content sources 510B, that can be external from the vehicle 600. For example, the content source 510 can be provided in the manner set forth in the co-pending United States patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties.

The viewing content can comprise any suitable type of viewing content, such as stored (or time-delayed) viewing content and/or live (or real-time) viewing content, in the manner set forth in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. As desired, the viewing content can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. In addition to entertainment content, such as live satellite television programming and/or live satellite radio programming, the viewing content preferably can include two-way communications such as real-time Internet access and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety.

Being configured to receive the viewing content from the content sources 510, the vehicle information system 500 can communicate with the content sources 510 in any conventional manner, preferably via wireless communications. As shown in FIGS. 6A-B, for example, the vehicle information system 500 can include an antenna system 520 and a transceiver system 530 for receiving the viewing content from the remote content sources 510B. The antenna system 520 preferably is disposed outside the vehicle 600, such as an exterior surface 640 of a fuselage 630 of the aircraft 620. The vehicle information system 500 likewise can include at least one conventional server system 510A, such as an information system controller 312 for providing overall system control functions for the vehicle information systems 500 and/or at least one media (or file) server system for storing preprogrammed content and/or the received viewing content, as desired. The server system 510A can include, and/or communicate with, one or more conventional peripheral media storage systems (not shown), including optical media devices, such as a digital video disk (DVD) system and/or a compact disk (CD) system, and or magnetic media systems, such as a video cassette recorder (VCR) system and/or a hard disk drive (HDD) system, of any suitable kind, for storing preprogrammed content and/or the received viewing content.

One or more passenger interface systems 540 are provided for selecting preprogrammed content and/or the received viewing content and for presenting the selected preprogrammed content and/or viewing content. As desired the passenger interface systems 540 can comprise conventional passenger interfaces and can be provided in the manner set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in the co-pending U.S. patent application, entitled "SYSTEM AND METHOD FOR PRESENTING HIGH-QUALITY VIDEO TO PASSENGERS ON A MOBILE PLATFORM," Ser. No. 60/673,171, filed on Apr. 19, 2005, the disclosure of which is hereby incorporated herein by reference in its entirety. Each passenger interface system 540 can include a video interface system and/or an audio interface system. Overhead cabin display systems with central controls, seatback display systems with individualized controls, crew display panels, and/or handheld presentation systems are exemplary video interface systems; whereas, illustrative conventional audio interface systems can be provided via the handheld presentation systems and/or headphones. Passengers (not shown) who are traveling aboard the vehicle 600 thereby can enjoy the preprogrammed content and/or the received viewing content during travel.

The antenna system 520 and the transceiver system 530 of the vehicle information system 500 is illustrated in FIGS. 6A-B as communicating with the server system 510A and the passenger interface systems 540 via a distribution system 700. The distribution system 700 can be provided in any conventional manner and is configured to support any conventional type of communications, including wired communications and/or wireless communications, as set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005. Preferably being distributed via high-speed data communications, the preprogrammed content and/or the received viewing content can be distributed throughout the vehicle information system 500 in any suitable manner, including in the manner set forth in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," the disclosures of which are hereby incorporated herein by reference in their entireties.

Figure 7:
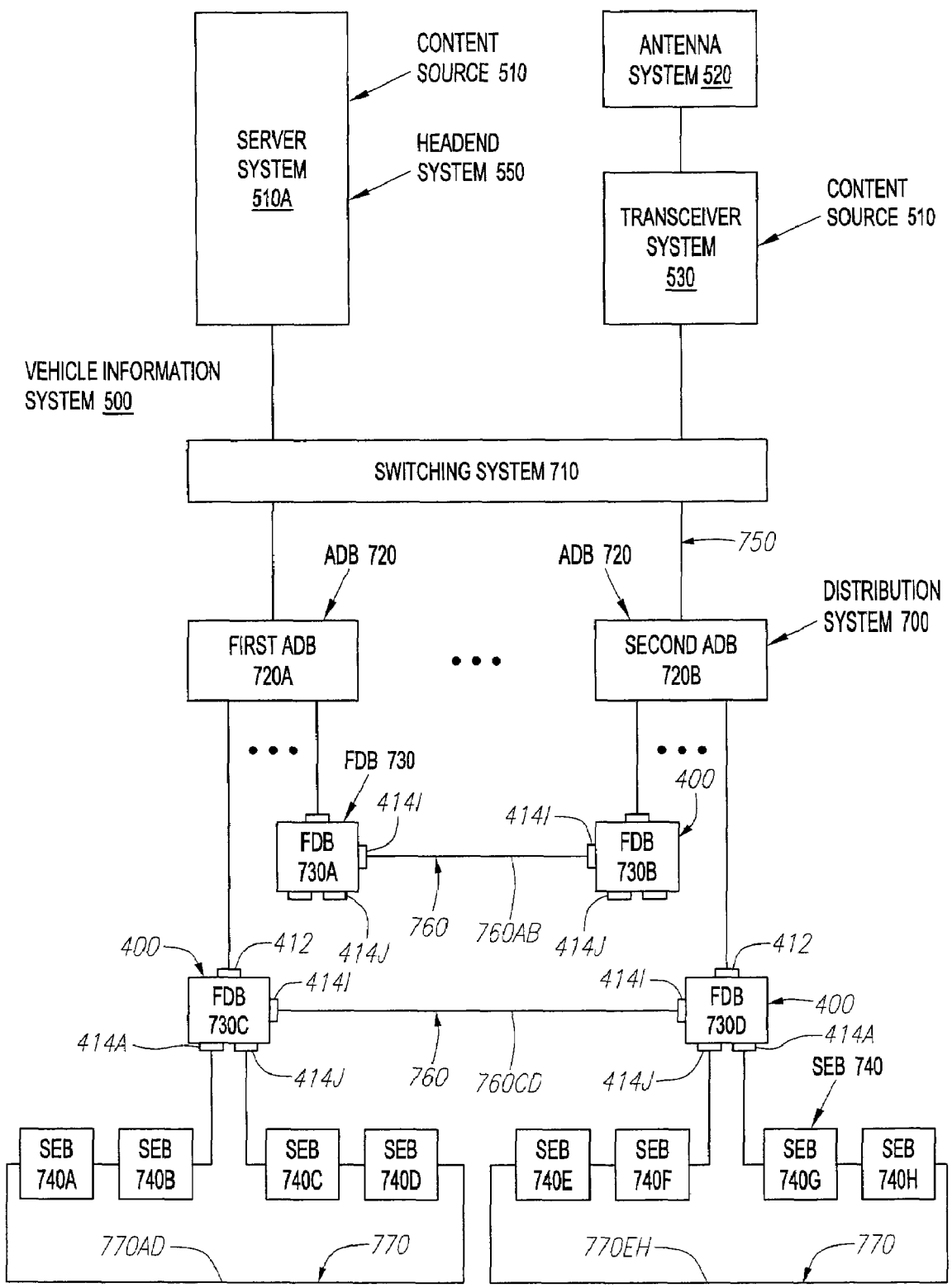
FIG. 7 is a detail drawing illustrating one preferred embodiment of a distribution system for the vehicle information system of FIGS. 6A-B, wherein the distribution system includes a plurality of routing systems each being disposed within a floor disconnect box.

An exemplary vehicle information system 500 is illustrated in FIG. 7. The vehicle information system 500 includes a headend system 550 and a plurality of passenger interface systems 540 (shown in FIGS. 6A-B) that are configured to communicate via a distribution system 700. The headend system 550 can have at least one content source 510, such as a server system 510A and/or an antenna system 520 and a transceiver system 530 each being provided in the manner set forth in more detail above. Although the distribution system 700 can be provided in any conventional manner as discussed above, the distribution system 700 as shown in FIG. 7 is provided in the manner set forth in the above-referenced U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES." The distribution system 700 thereby can be provided as a plurality of area distribution boxes (ADBs) 720, a plurality of floor disconnect boxes (FDBs) 730, and a plurality of seat electronics boxes (SEBS) 740 being configured to communicate via a plurality of communication connections 750.

As illustrated in FIG. 7, the distribution system 700 can include a switching system 710 for providing an interface between the distribution system 700 and the headend system 550. The switching system 710 can comprise a conventional switching system, such as an Ethernet switching system, and is configured to couple the headend system 550 with the area distribution boxes (ADBs) 720. Preferably, the switching system 710 is coupled with each of the area distribution boxes (ADBs) 720 via a communication connection 750.

As desired, the switching system 710 can be provided as a plurality of interconnected switching sub-systems (not shown). If the switching system 710 is provided as a plurality of interconnected switching sub-systems, each of the switching sub-systems likewise can be configured to communicate with each of the area distribution boxes (ADBs) 720 via a communication connection 750. Each of the area distribution boxes (ADBs) 720, in turn, is coupled with a plurality of floor disconnect boxes (FDBs) 730 via a plurality of communication connections 750. Although the area distribution boxes (ADBs) 720 and the associated floor disconnect boxes (FDBs) 730 can be coupled in any conventional configuration, the associated floor disconnect boxes (FDBs) 730 preferably are disposed in a star network topology about a central area distribution box (ADB) 720 as illustrated in FIG. 7.

Each floor disconnect box (FDB) 730 is coupled with, and services, a plurality of daisy-chains of seat electronics boxes (SEBs) 740. Although it will be noted that the number and specific configuration of the seat electronics boxes (SEBs) 740 may be varied from system to system, the floor disconnect box (FDB) 730 are shown and described with reference to FIG. 7 as being coupled with, and servicing, two daisy-chains of seat electronics boxes (SEBs) 740 for purposes of illustration. Each of the daisy-chains of seat electronics boxes (SEBs) 740 likewise can include any suitable number of seat electronics boxes (SEBs) 740 and is illustrated in FIG. 7 as including two daisy-chained seat electronics boxes (SEBs) 740. The seat electronics boxes (SEBs) 740, in turn, are configured to communicate with the plurality of passenger interface systems 540 (shown in FIGS. 6A-B).

The floor disconnect boxes (FDBs) 730 advantageously can be provided as routing systems 400 in the manner discussed in more detail above with reference to FIGS. 2, 3, 4A-B, and 5. For example, the floor disconnect boxes (FDBs) 730 can be provided as routing systems 400 shown in FIGS. 4A-B as shown in FIG. 7. Each floor disconnect box (FDB) 730 therefore includes the input (or common) communication port 412 and the output communication ports 414A, 414I, 414J, which are configured to communicate via the active switching system 430 (shown in FIGS. 4A-B), the bypass system 470 (shown in FIGS. 4A-B), and/or the bypass system 480 (shown in FIGS. 4A-B). In the manner discussed in more detail above with reference to the routing system 400 of FIGS. 4A-B, the switching system 430 couples the input communication port 412 with each of the output communication ports 414A, 414I, 414J when the routing system 400 is in a normal operation mode. In a failure mode, however, the bypass system 470 couples the input communication port 412 with the output communication ports 414A; whereas, the output communication ports 414I, 414J are coupled via the bypass system 480. The switching system 430 thereby is bypassed in the failure mode.

As desired, the distribution system 700 can include at least one FDB internal port bypass connection 760 and/or at least one SEB loopback connection 770. Each FDB internal port bypass connection 760 is a communication connection that permits floor disconnect boxes (FDBs) 730 associated with different area distribution boxes (ADBs) 720 to directly communicate. As illustrated in FIG. 7, for example, the output communication port 414I of the floor disconnect box (FDB) 730A and the output communication port 414I of the floor disconnect box (FDB) 730B are coupled via the FDB internal port bypass connection 760AB. Similarly, the FDB internal port bypass connection 760CD can directly couple the output communication ports 414I of the floor disconnect boxes (FDBs) 730C, 730D.

Each SEB loopback connection 770 is a communication connection that directly couples the last daisy-chained seat electronics box (SEB) 740 associated with the output communication port 414A of a selected floor disconnect box (FDB) 730 with the last daisy-chained seat electronics box (SEB) 740 associated with the output communication port 414J of the same selected floor disconnect box (FDB) 730 as shown in FIG. 7. Each SEB loopback connection 770 therefore forms a loopback path among the daisy-chained seat electronics boxes (SEBs) 740 coupled with the relevant floor disconnect box (FDB) 730. As shown in FIG. 7, the SEB loopback connection 770AD couples the seat electronics box (SEB) 740A and the seat electronics box (SEB) 740D, which are associated with the floor disconnect box (FDB) 730C. Similarly, the seat electronics box (SEB) 740E and the seat electronics box (SEB) 740H are associated with the floor disconnect box (FDB) 730D and are coupled via the SEB loopback connection 770EH as illustrated in FIG. 7.

When the distribution system 700 is in the normal operation mode, the floor disconnect boxes (FDBs) 730 facilitate high-speed exchanges communication signals 300 (shown in FIG. 2) among the headend system 550 and the passenger interface systems 540 without effecting bandwidth in the manner discussed in more detail above. The floor disconnect boxes (FDBs) 730 likewise support continued exchanges of communication signals 300 without any significant interruption in communications if the distribution system 700 enters a failure mode. The operation of the distribution system 700 in response to various failure events is shown and described with reference to FIGS. 8A-C.

Turning to FIG. 5A, for example, the operation of the distribution system 700 of FIG. 7 is illustrated when the floor disconnect box (FDB) 730C enters a failure mode. The floor disconnect box (FDB) 730C can fail, for example, due to a loss of routing system power 498 (shown in FIG. 5) and/or a device failure, such as a malfunction within the switching system 430. When the floor disconnect box (FDB) 730C enters the failure mode, the bypass system 470 (shown in FIGS. 4A-B) couples the communication ports 412, 414A, and the communication ports 414I, 414J are coupled via the bypass system 480 (shown in FIGS. 4A-B) in the manner set forth in more detail above. The distribution system 700 therefore reroutes the associated communication signals 300 in accordance with a bypass path 780, such as bypass path 782, to bypass the malfunctioning floor disconnect box (FDB) 730C.

Figure 8A:
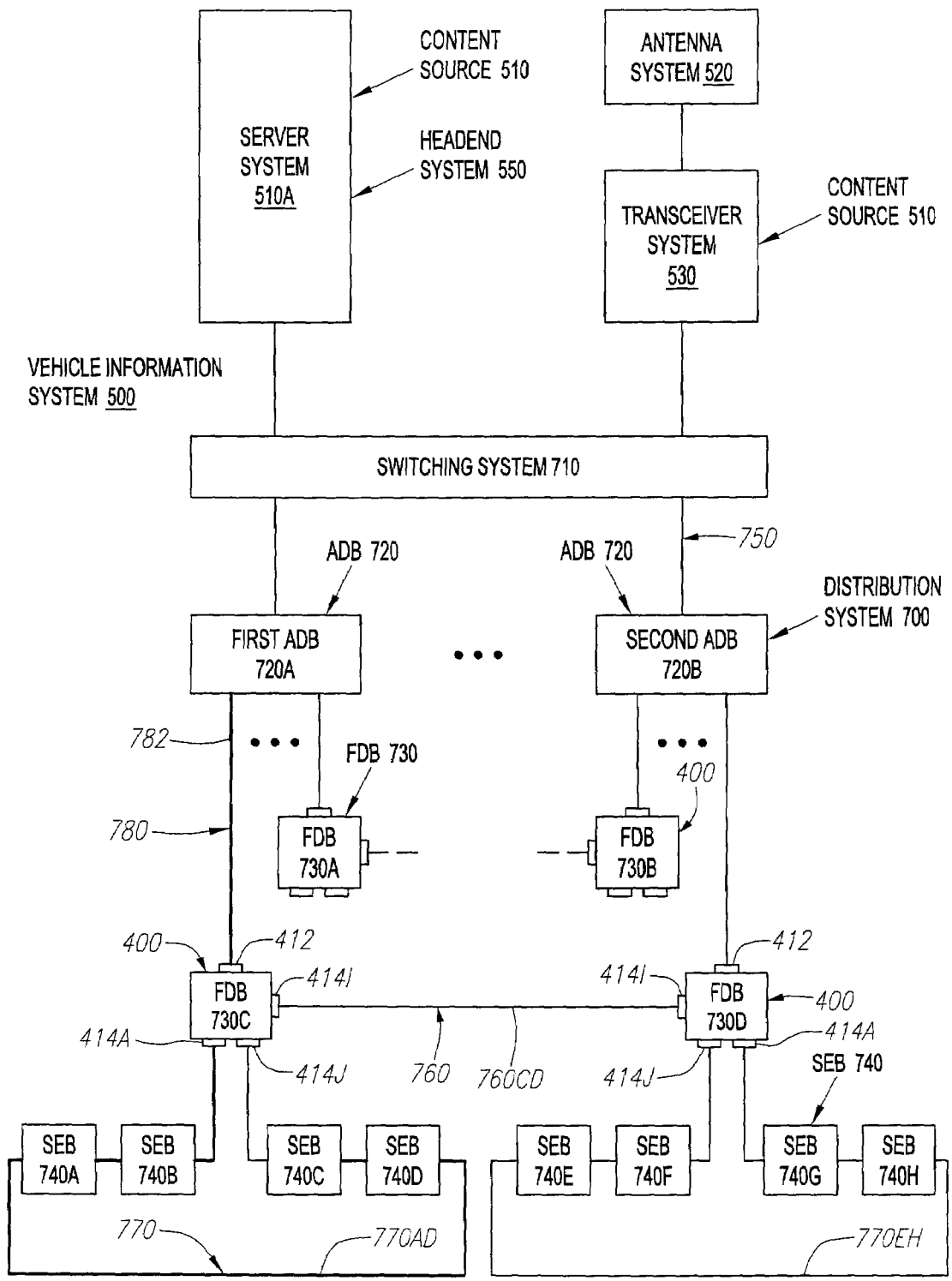
FIG. 8A is a detail drawing illustrating the vehicle information system of FIG. 7 when a selected routing system enters a failure mode.

As shown in FIG. 8A, the bypass path 782 can begin at the first area distribution box (ADB) 720A. The bypass path 782 proceeds to the input communication port 412 of the malfunctioning floor disconnect box (FDB) 730C. In the manner discussed above, the communication ports 412, 414A of the floor disconnect box (FDB) 730C are coupled via the bypass system 470 such that the bypass path 782 continues to the output communication port 414A of the malfunctioning floor disconnect box (FDB) 730C. Passing through the daisy-chained seat electronics boxes (SEBs) 740B, 740A, the bypass path 782 reaches the SEB loopback connection 770AD and is fed back to the daisy-chained seat electronics boxes (SEBs) 740D, 740C. Therefore, even though the floor disconnect box (FDB) 730C has experienced a malfunction, each of the seat electronics boxes (SEBs) 740A-D, which are associated with the malfunctioning floor disconnect box (FDB) 730C, continue to receive service such that the relevant passenger interface systems 540 (shown in FIGS. 6A-B) can continue to communicate with the headend system 550.

Figure 8B:
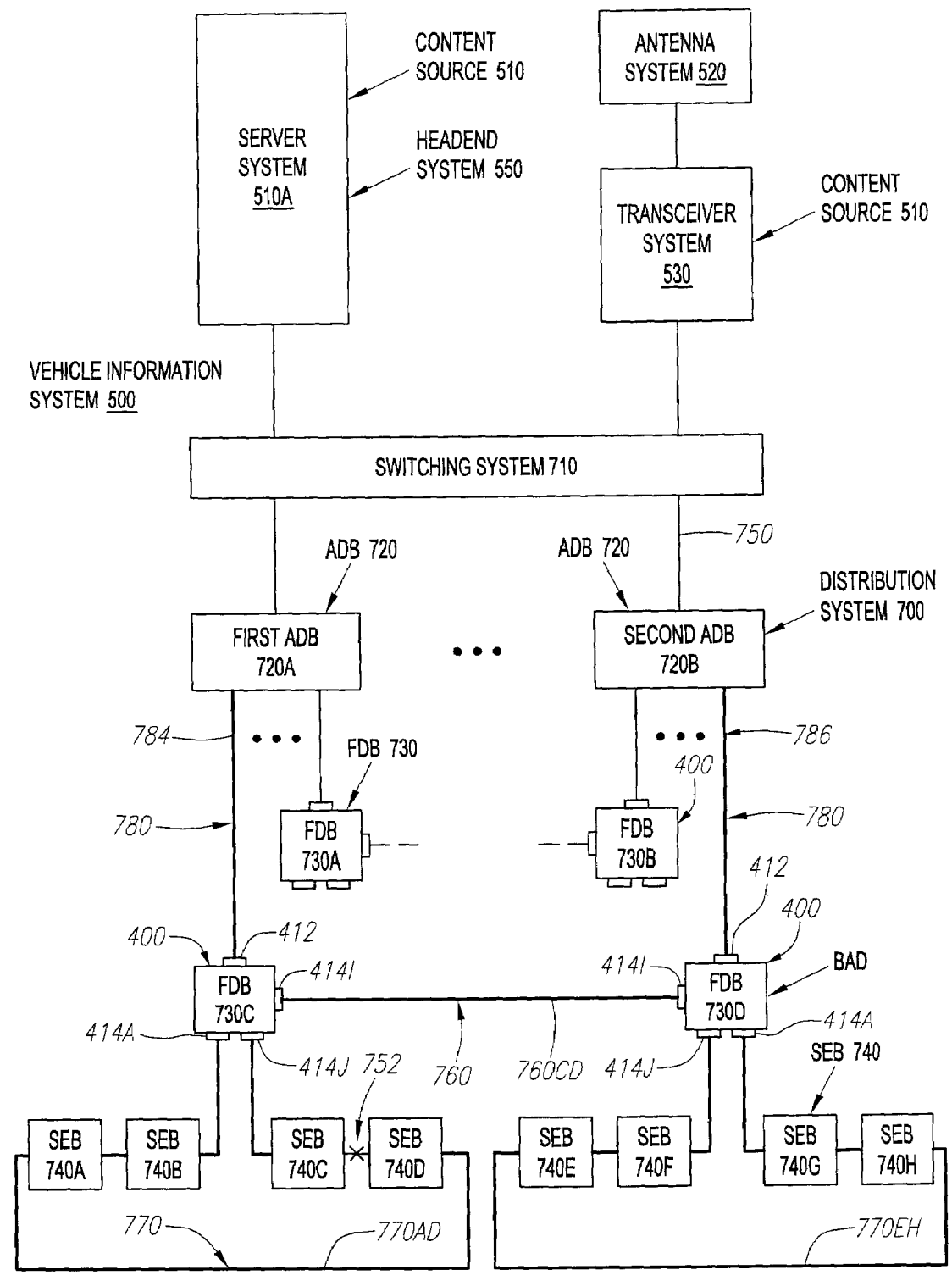
FIG. 8B is a detail drawing illustrating the vehicle information system of FIG. 7 when a selected communication fails.

The operation of the distribution system 700 of FIG. 7 likewise is illustrated in FIG. 8B when a selected communication connection 752 becomes disconnected or otherwise fails. In the manner discussed above with reference to FIG. 8A, the bypass system 470 (shown in FIGS. 4A-B) couples the communication ports 412, 414A, and the communication ports 414I, 414J are coupled via the bypass system 480 (shown in FIGS. 4A-B) when the floor disconnect box (FDB) 730 enters a failure mode. The distribution system 700 therefore again reroutes the associated communication signals 300 in accordance with a pair of bypass paths 780, namely bypass path 784 and bypass path 786, to bypass the malfunctioning communication connection 752.

As set forth in more detail above with reference to the bypass path 782 (shown in FIG. 8A), the bypass path 784 begins at the first area distribution box (ADB) 720A and proceeds to the input communication port 412 of the floor disconnect box (FDB) 730C. The communication ports 412, 414A of the floor disconnect box (FDB) 730C are coupled via the bypass system 470 such that the bypass path 784 continues to the output communication port 414A of the malfunctioning floor disconnect box (FDB) 730C. Passing through the daisy-chained seat electronics boxes (SEBs) 740B, 740A, the bypass path 784 reaches the SEB loopback connection 770AD and is fed back to the daisy-chained seat electronics box (SEB) 740D. Since the malfunctioning communication connection 752 is disposed between the seat electronics boxes (SEBs) 740C, 740D, the bypass path 784 cannot proceed to the seat electronics box (SEB) 740C.

The bypass path 786 therefore is employed to provide service to the seat electronics box (SEB) 740C. The bypass path 786 as illustrated in FIG. 8B can begin at the second area distribution box (ADB) 720B and can proceed in the manner discussed above with reference to the bypass path 782. The bypass path 786 proceeds to the input communication port 412 of the floor disconnect box (FDB) 730D. In the manner discussed above, the communication ports 412, 414A of the floor disconnect box (FDB) 730D are coupled via the bypass system 470 such that the bypass path 786 continues to the output communication port 414A of the floor disconnect box (FDB) 730D. Passing through the daisy-chained seat electronics boxes (SEBs) 740G, 740H, the bypass path 786 reaches the SEB loopback connection 770EH and is fed back to the daisy-chained seat electronics boxes (SEBs) 740E, 740F.

Since the output communication ports 414I, 414J of the floor disconnect box (FDB) 730D likewise are coupled, the bypass path 786 can continue via the FDB internal port bypass connection 760CD, extending to the floor disconnect box (FDB) 730C. The bypass path 786 continues across the coupled output communication ports 414I, 414J of the floor disconnect box (FDB) 730C and therefore reaches the seat electronics box (SEB) 740C. Once again, despite the malfunctioning communication connection 752, each of the seat electronics boxes (SEBs) 740A-H, including the seat electronics box (SEB) 740C that was isolated by the malfunctioning communication connection 752, continue to receive service such that the relevant passenger interface systems 540 (shown in FIGS. 6A-B) can continue to communicate with the headend system 550.

Figure 8C:
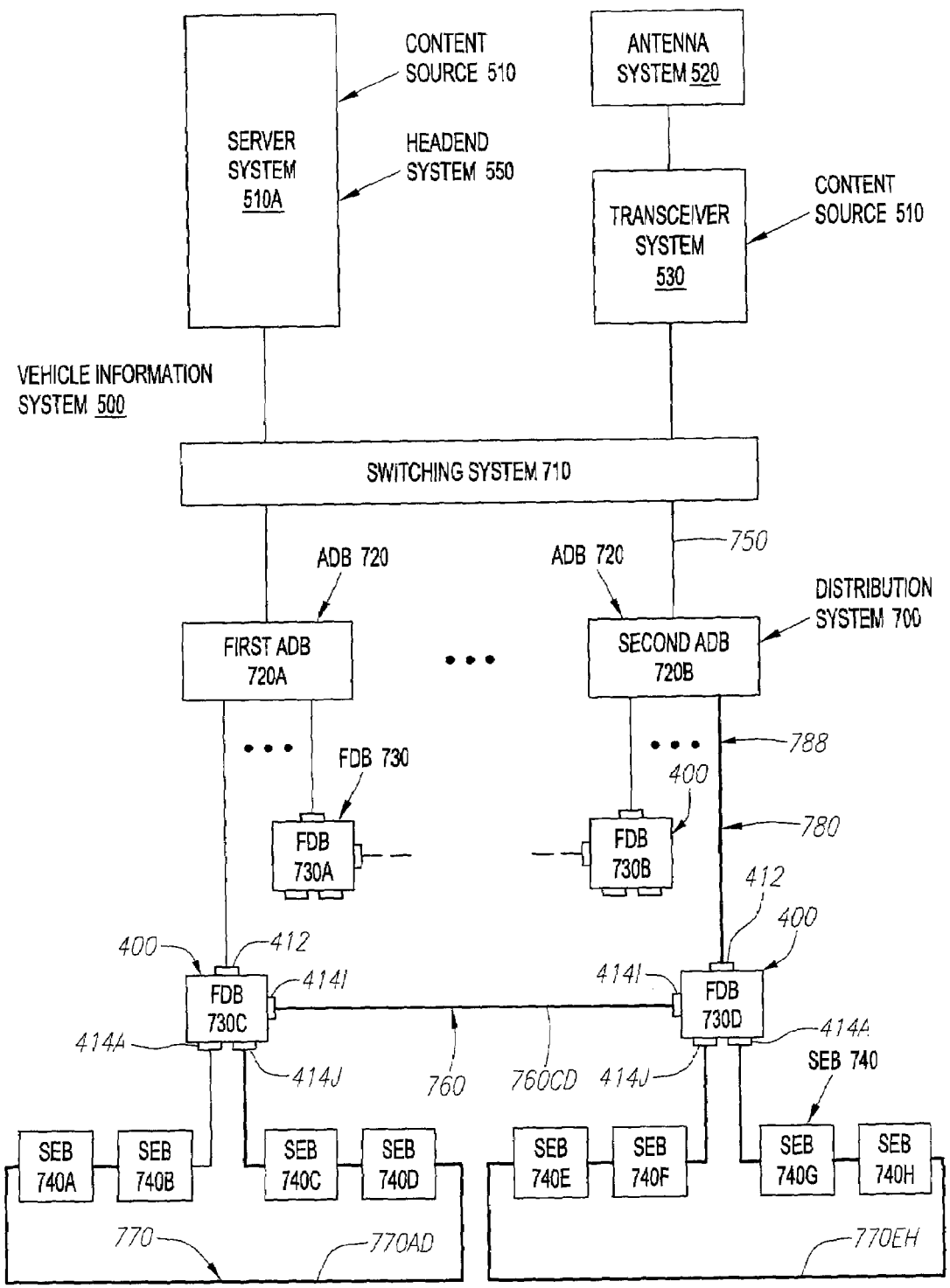
FIG. 8C is a detail drawing illustrating the vehicle information system of FIG. 7 when a selected system resource enters a failure mode.

The distribution system 700 of FIG. 7 can be advantageously applied to maintain communication among the passenger interface systems 540 and the headend system 550 even then the source of the failure mode is remote from the floor disconnect boxes (FDB) 730. Turning to FIG. 8C, for example, the operation of the distribution system 700 is demonstrated when an remote system resource 210, here the first area distribution box (ADB) 720A, malfunctions. Since the first area distribution box (ADB) 720A is experiencing a malfunction, the distribution system 700 therefore reroutes the associated communication signals 300 in accordance with a bypass path 788, to bypass the malfunctioning first area distribution box (ADB) 720A. The seat electronics boxes (SEBs) 740A-D, which are associated with the malfunctioning first area distribution box (ADB) 720A, therefore can be serviced by the second area distribution box (ADB) 720B.

In the manner discussed above with reference to the bypass path 786 (shown in FIG. 8B), the bypass path 788 can begin at the second area distribution box (ADB) 720B and proceed to the input communication port 412 of the floor disconnect box (FDB) 730D. Since the communication ports 412, 414A of the floor disconnect box (FOB) 730D are coupled via the bypass system 470, the bypass path 788 continues to the output communication port 414A of the floor disconnect box (FOB) 730D. Passing through the daisy-chained seat electronics boxes (SEBs) 740G, 740H, the bypass path 788 reaches the SEB loopback connection 770EH and is fed back to the daisy-chained seat electronics boxes (SEBs) 740E, 740F. The output communication ports 414I, 414J of the floor disconnect box (FOB) 7300 likewise are coupled such that the bypass path 788 continues via the FOB internal port bypass connection 760CD and extends to the floor disconnect box (FOB) 730C. The bypass path 788 continues across the coupled output communication ports 414I, 414J of the floor disconnect box (FOB) 730C and therefore reaches the daisy-chained seat electronics boxes (SEBs) 740C, 7400. Passing through the daisy-chained seat electronics boxes (SEBs) 740C, 740D, the bypass path 788 reaches the SEB loopback connection 770AD and is fed back to the daisy-chained seat electronics boxes (SEBs) 740A, 740B.

Therefore, even though the floor disconnect box (FDB) 730C has experienced a malfunction, each of the seat electronics boxes (SEBs) 740A-D, which are associated with the malfunctioning floor disconnect box (FDB) 730C, continue to receive service such that the relevant passenger interface systems 540 (shown in FIGS. 6A-B) can continue to communicate with the headend system 550. Despite the malfunctioning first area distribution box (ADB) 720A, each of the seat electronics boxes (SEBs) 740A-H, including the seat electronics boxes (SEBs) 740A-D associated with the malfunctioning first area distribution box (ADB) 720A, continue to receive service such that the relevant passenger interface systems 540 (shown in FIGS. 6A-B) can continue to communicate with the headend system 550.

The disclosure is susceptible to various modifications and alternative forms, and specific examples thereof have been shown by way of example in the drawings and are herein described in detail. It should be understood, however, that the disclosure is not to be limited to the particular forms or methods disclosed, but to the contrary, the disclosure is to cover all modifications, equivalents, and alternatives.

What is claimed is:

1. A vehicle information system, comprising:
a headend system for providing viewing content; and
a distribution system, including:
- a plurality of communication connections including a first communication connection, a second communication connection, and a third communication connection each having a predetermined data width;
- a first area distribution box for receiving said viewing content from said headend system; and
- a first floor disconnect box, comprising:
  - a plurality of communication ports, including a first communication port for receiving said viewing content from said first area distribution box via said first communication connection, a second communication port for communicating with a first daisy-chain configuration of seat electronics boxes via said second communication connection, and a third communication port for communicating with a second daisy-chain configuration of said seat electronics boxes via said third communication connections last seat electronics box of the first daisy-chain configuration and a last seat electronics box of the second daisy-chain configuration being coupled via a loopback connection;
  - an active switching system for exchanging high-speed communication signals among said first, second, and third communication ports;
  - a bypass system for bypassing said active switching system if said active switching system enters a failure mode by directly coupling at least two of said communication ports; and
  - a power system for providing power to at least one floor disconnect box component, including said active switching system and said bypass system, said power system having a power conversion system for receiving power from at least one of said first area distribution box and said seat electronics boxes and for providing power to at least one of said first area distribution box and said seat electronics boxes, wherein the communication signals are exchanged among said headend system and said seat electronics boxes without a reduction in signal bandwidth when said active switching system is in a normal operation mode and with a reduced signal bandwidth if said active switching system enters said failure mode.

2. The vehicle information system of claim 1, wherein said headend system includes at least one content source selected from the group of content sources consisting of a server system, a media server system, an antenna system, and a transceiver system.

3. The vehicle information system of claim 1, wherein each of said seat electronics boxes is coupled with a passenger interface system.

4. The vehicle information system of claim 1, wherein said distribution system further includes an interface switching system for interfacing said headend system with said first area distribution box.

5. The vehicle information system of claim 4, wherein said interface switching system comprises an Ethernet switching system.

6. The vehicle information system of claim 4, wherein said interface switching system is provided as a plurality of interconnected switching sub-systems.

7. The vehicle information system of claim 1, wherein each of said seat electronics boxes is coupled with a passenger interface system.

8. The vehicle information system of claim 1, wherein said bypass system directly couples said first and second communication ports.

9. The vehicle information system of claim 1, wherein said bypass system directly couples said second and third communication ports.

10. The vehicle information system of claim 1, further comprising a second floor disconnect box for receiving said viewing content from said first area distribution box via a fourth communication connection having said predetermined data width.

11. The vehicle information system of claim 10, wherein said first and second floor disconnect boxes are connected to said first area distribution box in a star configuration.

12. The vehicle information system of claim 1, further comprising a second area distribution box for receiving said viewing content from said headend system and a second floor disconnect box for receiving said viewing content from said second area distribution box via a fourth communication connection having said predetermined data width.

13. The vehicle information system of claim 12, further comprising a third floor disconnect box for receiving said viewing content from said second area distribution box via a fifth communication connection having said predetermined data width.

14. The vehicle information system of claim 13, wherein said second and third floor disconnect boxes are connected to said second area distribution box in a star configuration.

15. The vehicle information system of claim 12,
wherein said plurality of communication connections further includes fifth and sixth communication connections, each having said predetermined data width; and
wherein said second floor disconnect box comprises:
- a second plurality of communication ports, including a fourth communication port for receiving said viewing content from said second area distribution box via said fourth communication connection, a fifth communication port for communicating with a third plurality of said seat electronics boxes via said fifth communication connection, and a sixth communication port for communicating with a fourth plurality of said seat electronics boxes via said sixth communication connection;
- an second active switching system for exchanging the high-speed communication signals among said fourth, fifth, and sixth communication ports; and
- a second bypass system for bypassing said second active switching system if said second active switching system enters a second failure mode by directly coupling at least two of said communication ports in said second plurality.

16. The vehicle information system of claim 15, wherein said third plurality of said seat electronics boxes are connected with said fifth communication port in a third daisy-chain configuration and wherein said fourth plurality of said seat electronics boxes are connected with said sixth communication port in a fourth daisy-chain configuration.

17. The vehicle information system of claim 16, wherein a last seat electronics box of said third daisy-chain configuration and a last seat electronics box of said fourth daisy-chain configuration are coupled via a second loopback connection.

18. The vehicle information system of claim 15, wherein said plurality of said communication ports of said first floor disconnect box further includes a seventh communication port, and wherein said second plurality of said communication ports of said second floor disconnect box further includes an eighth communication port coupled with said seventh communication port via a port bypass connection.

19. The vehicle information system of claim 1, further comprising a passenger interface system being coupled with a selected seat electronics box.

20. The vehicle information system of claim 1, wherein each of said seat electronics boxes is coupled with a passenger interface system.

21. The vehicle information system of claim 1, wherein said vehicle information system comprises a passenger entertainment system.

22. The vehicle information system of claim 21, wherein said vehicle information system is disposed onboard an aircraft.

23. An aircraft, comprising:
    a fuselage and a plurality of passengers seat arranged within the fuselage; and
    a vehicle information system disposed within the fuselage and having a headend system for providing viewing content and a distribution system, said distribution system including:
        a plurality of communication connections including a first communication connection, a second communication connection, and a third communication connection each having a predetermined data width;
        a first area distribution box for receiving the viewing content from said the headend system; and
        a first floor disconnect box, comprising:
            a plurality of communication ports, including a first communication port for receiving the viewing content from said first area distribution box via said first communication connection, a second communication port for communicating with a first daisy-chain configuration of seat electronics boxes via said second communication connection, and a third communication port for communicating with a second daisy-chain configuration of said seat electronics boxes via said third communication connections last seat electronics box of the first daisy-chain configuration and a last seat electronics box of the second daisy-chain configuration being coupled via a loopback connection;
            an active switching system for exchanging high-speed communication signals among said first, second, and third communication ports;
            a bypass system for bypassing said active switching system if said active switching system enters a failure mode by directly coupling at least two of said communication ports; and
            a power system for providing power to at least one floor disconnect box component, including said active switching system and said bypass system, said power system having a power conversion system for receiving power from at least one of said first area distribution box and said seat electronics boxes and for providing power to at least one of said first area distribution box and said seat electronics boxes,
        wherein the communication signals are exchanged among the headend system and the seat electronics boxes without a reduction in signal bandwidth when said active switching system is in a normal operation mode and with a reduced signal bandwidth if said active switching system enters said failure mode.

24. An aircraft including a vehicle information system characterized by claim 1.

25. A distribution system for a vehicle information system, comprising:
    a plurality of communication connections including a first communication connection, a second communication connection, and a third communication connection each having a predetermined data width;
    a first area distribution box for receiving viewing content from a headend system; and
    a first floor disconnect box, comprising:
        a plurality of communication ports, including a first communication port for receiving the viewing content from said first area distribution box via said first communication connection, a second communication port for communicating with a first daisy-chain configuration of seat electronics boxes via said second communication connection, and a third communication port for communicating with a second daisy-chain configuration of the seat electronics boxes via said third communication connection, a last seat electronics box of the first daisy-chain configuration and a last seat electronics box of the second daisy-chain configuration being coupled via a loopback connection;
        an active switching system for exchanging high-speed communication signals among said first, second, and third communication ports;
        a bypass system for bypassing said active switching system if said active switching system enters a failure mode by directly coupling at least two of said communication ports; and
        a power system for providing power to at least one floor disconnect box component, including said active switching system and said bypass system, said power system having a power conversion system for receiving power from at least one of said first area distribution box and the seat electronics boxes and for providing power to at least one of said first area distribution box and the seat electronics boxes,
    wherein the communication signals are exchanged among the headend system and the seat electronics boxes without a reduction in signal bandwidth when said active switching system is in a normal operation mode and with a reduced signal bandwidth if said active switching system enters the failure mode.

26. The distribution system of claim 25, wherein said distribution system comprises a wired distribution system.

27. The distribution system of claim 26, wherein said wired distribution system includes at least one fiber optic communication connection.

28. The distribution system of claim 26, wherein said wired distribution system includes at least one copper communication connection.

29. The distribution system of claim 25, wherein said active switching system comprises a high-speed Ethernet switching system.

30. The distribution system of claim 29, wherein said wired distribution system supports wired communications having a protocol type selected from a group of protocol standards consisting of Ethernet, Fast Ethernet, and Gigabit Ethernet.

31. The distribution system of claim 25, wherein said bypass system directly couples at least two of said second communication ports.

32. The distribution system of claim 25, wherein said bypass system directly couples said first communication port with at least one of said second communication ports.

33. The distribution system of claim 25, wherein the failure mode is selected from a group of failure modes consisting of a loss of power to the routing system, a loss of power to a selected system resource, a broken communication connection, and a switching system failure.

34. The distribution system of claim 25, wherein said distribution system is disposed within a vehicle information system.

35. The distribution system of claim 34, wherein said distribution system is disposed onboard an aircraft.

36. A routing system, comprising:
a plurality of communication ports, including a first communication port for receiving viewing content from a selected system resource via a first communication connection, a second communication port for communicating with a first daisy-chain configuration of system resources via a second communication connection, and a third communication port for communicating with a second daisy-chain configuration of the system resources via a third communication connection, a last system resource of the first daisy-chain configuration and a last system resource of the second daisy-chain configuration being coupled via a loopback connection, each of the communication connections having a predetermined data width;
an active switching system for exchanging high-speed communication signals among said first, second, and third communication ports;
a bypass system for bypassing said active switching system if said active switching system enters a failure mode by directly coupling at least two of said communication ports; and
a power system for providing power to at least one routing system component, including said active switching system and said bypass system, said power system having a power conversion system for receiving power from at least one of the system resources and for providing power to at least one of the system resources,
wherein the communication signals are exchanged among the system resources without a reduction in signal bandwidth when said active switching system is in a normal operation mode and with a reduced signal bandwidth if said active switching system enters the failure mode.

37. The routing system of claim 36, wherein said active switching system exchanges the high-speed communication signals with said first communication port via a transceiver system.

38. The routing system of claim 36, wherein said active switching system exchanges the high-speed communication signals with at least one of second communication ports via a transceiver system.

39. The routing system of claim 36, wherein said active switching system comprises a high-speed Ethernet switching system.

40. The routing system of claim 39, wherein said active switching system supports a communication protocol type selected from a group of protocol standards consisting of Ethernet, Fast Ethernet, and Gigabit Ethernet.

41. The routing system of claim 39, wherein said active switching system is controlled via a control system.

42. The routing system of claim 36, wherein said bypass system directly couples at least two of said second communication ports.

43. The routing system of claim 36, wherein said bypass system directly couples said first communication port with at least one of said second communication ports.

44. The routing system of claim 36, wherein said bypass system comprises an electronic relay system.

45. The routing system of claim 36, wherein said power conversion system includes a plurality of redundant power conversion sub-systems.

46. The routing system of claim 36, wherein said power conversion system includes at least one DC-to-DC conversion system.

47. The routing system of claim 36, wherein said routing system is disposed within a distribution system.

48. The routing system of claim 47, wherein said routing system is disposed within a floor disconnect box of the distribution system.

49. The routing system of claim 36, wherein the failure mode is selected from a group of failure modes consisting of a loss of power to the routing system, a loss of power to a selected system resource, a broken communication connection, and a switching system failure.

50. A vehicle information system including a routing system characterized by claim 36.

51. An aircraft including a vehicle information system having a routing system characterized by claim 36.

52. A method for routing high-speed communication signals, comprising:
providing a plurality of communication ports, including a first communication port for receiving viewing content from a selected system resource via a first communication connection, a second communication port for communicating with a first daisy-chain configuration of system resources via a second communication connection, and a third communication port for communicating with a second daisy-chain configuration of the system resources via a third communication connection, a last system resource of the first daisy-chain configuration and a last system resource of the second daisy-chain configuration being coupled via a loopback connection, each of the communication connections having a predetermined data width;
exchanging high-speed communication signals among said first, second, and third communication ports via an active switching system;
bypassing the active switching system if the active switching system enters a failure mode by directly coupling at least two of said communication ports via a bypass system; and
providing power to at least one routing system component, including the active switching system and the bypass system, via a power conversion system that receives power from at least one of the system resources and that provides power to at least one of the system resources,
wherein the communication signals are exchanged among the system resources without a reduction in signal bandwidth when said active switching system is in a normal operation mode and with a reduced signal bandwidth if said active switching system enters the failure mode.

53. The method of claim 52, further comprising providing the system resources.

54. The method of claim 52, wherein said exchanging the high-speed communication signals comprises exchanging the high-speed communication signals in accordance with a communication protocol type selected from the group of protocol standards consisting of Ethernet, Fast Ethernet, and Gigabit Ethernet.

55. The method of claim 52, wherein said coupling said at least two of said communication ports includes directly coupling at least two of said second communication ports.

56. The method of claim 52, wherein said coupling said at least two of said communication ports includes directly coupling said first communication port with at least one of said second communication ports.

57. The method of claim 52, further comprising detecting the failure mode.

58. The method of claim 52, further comprising controlling said active switching system via a control system.

* * * * *